United States Patent
He et al.

(10) Patent No.: US 12,506,583 B2
(45) Date of Patent: Dec. 23, 2025

(54) UNIFIED TRANSMISSION CONFIGURATION INDICATOR STATE SELECTION FOR PHYSICAL DOWNLINK SHARED CHANNEL OR PHYSICAL UPLINK SHARED CHANNEL TRANSMISSIONS

(71) Applicant: Apple Inc., Cupertino, CA (US)

(72) Inventors: Hong He, San Jose, CA (US); Ankit Bhamri, Bad Nauheim (DE); Chunxuan Ye, San Diego, CA (US); Dawei Zhang, Saratoga, CA (US); Haitong Sun, Cupertino, CA (US); Huaning Niu, San Jose, CA (US); Jie Cui, San Jose, CA (US); Seyed Ali Akbar Fakoorian, San Diego, CA (US); Sigen Ye, Whitehouse Station, NJ (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 18/365,944

(22) Filed: Aug. 4, 2023

(65) Prior Publication Data
US 2024/0048345 A1    Feb. 8, 2024

Related U.S. Application Data

(60) Provisional application No. 63/396,168, filed on Aug. 8, 2022.

(51) Int. Cl.
*H04L 5/00* (2006.01)
*H04W 72/23* (2023.01)

(52) U.S. Cl.
CPC .......... *H04L 5/0094* (2013.01); *H04L 5/0053* (2013.01); *H04W 72/23* (2023.01)

(58) Field of Classification Search
CPC ... H04L 5/0094; H04L 5/0053; H04L 5/0035; H04L 5/0044; H04W 72/23; H04B 7/088; H04B 7/0695
See application file for complete search history.

(56) References Cited

U.S. PATENT DOCUMENTS

2020/0351841 A1*  11/2020  Cirik ................... H04B 7/0695
2022/0217705 A1*   7/2022  Zhou ..................... H04L 5/001
(Continued)

FOREIGN PATENT DOCUMENTS

| WO | 2022024079 A1 | 2/2022 |
| WO | 2022052954 A1 | 3/2022 |
| WO | 2023171243 A1 | 9/2023 |

OTHER PUBLICATIONS

Varatharaajan, Sutharshun, Marcus Grossmann, and Giovanni Del Galdo. "5G new radio physical downlink control channel reliability enhancements for multiple transmission-reception-point communications." IEEE Access 10 (2022): 97394-97407. (Year: 2022).*
(Continued)

*Primary Examiner* — Sharad Rampuria
(74) *Attorney, Agent, or Firm* — Kilpatrick Townsend & Stockton

(57) ABSTRACT

The present application relates to selecting one or more of activated transmission configuration indicator (TCI) states for communications between a network and a user equipment. In an example, the network includes multiple transmission and reception points (TRPs) with which the UE communications. An activated TCI state can be a unified downlink TCI state that applies to multiple downlink channels or a unified uplink TCI state that applies to multiple uplink channels, where this state has already been activated by the network for the UE. Based on a predefined set of rules or network-based signaling, the UE can determine for a downlink or uplink communication with the network, one or
(Continued)

more of the activated TCI states to use to then perform the downlink or uplink communication with the network.

22 Claims, 24 Drawing Sheets

(56) References Cited

U.S. PATENT DOCUMENTS

| | | | | |
|---|---|---|---|---|
| 2023/0081552 A1* | 3/2023 | Chou | ............... | H04B 7/0404 370/329 |
| 2023/0421340 A1 | 12/2023 | Tidestav et al. | | |
| 2025/0089120 A1 | 3/2025 | Park et al. | | |
| 2025/0106927 A1 | 3/2025 | Jang et al. | | |
| 2025/0141607 A1 | 5/2025 | Lee et al. | | |
| 2025/0159693 A1 | 5/2025 | Matsumura et al. | | |
| 2025/0260525 A1 | 8/2025 | Matsumura et al. | | |
| 2025/0279869 A1 | 9/2025 | Matsumura et al. | | |

OTHER PUBLICATIONS

3GPP A Global Initiative, "3$^{rd}$ Generation Patrnership Project; Technical Specification Group Radio Access Network; NR; Physical layer procedures for control (Release 17)," 3gPP TS 38.213 V17.2.0 (Jun. 2022), Jun. 23, 2022, 269 pages.

3GPP A Global Initiative, "3$^{rd}$ Generation Partnership Project; Technical Specification Group Radio Access Network; NR; Physical layer procedures for data (Release 17)," 3GPP TS 38.214 V17.2.0 (Jun. 2022), Jun. 23, 2022, 227 pages.

3GPP A Global Initiative, "3$^{rd}$ Generation Partnership Project; Technical Specification Group Radio Access Network; NR; Medium Access Control (MAC) protocol specification (Release 17)," 3GPP TS 38.321V17.1.0(Jun. 2022), Jul. 20, 2022, 215 pages.

International Patent Application No. PCT/US2023/029483, "International Preliminary Report on Patentability", Feb. 20, 2025, 8 pages.

International Patent Application No. PCT/US2023/029483, "International Search Report and Written Opinion", Nov. 29, 2023, 11 pages.

International Patent Application No. PCT/US2023/029484, "International Preliminary Report on Patentability", Feb. 20, 2025, 8 pages.

International Patent Application No. PCT/US2023/029484, "International Search Report and Written Opinion", Oct. 30, 2023, 11 pages.

* cited by examiner

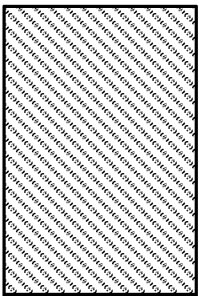
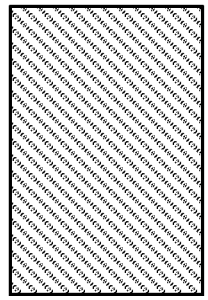
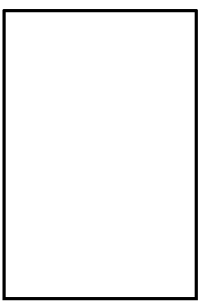
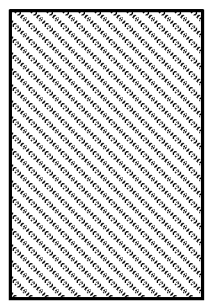
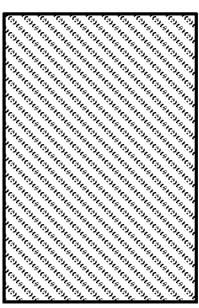
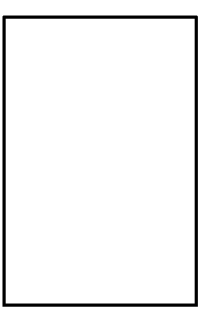
Cyclic Mapping 510
Sequential Mapping 520
 Resource Set with unified TCI state #i
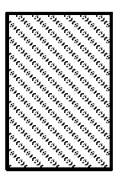 Resource Set with unified TCI state #j
FIG. 5

1800 ⟶

Receiving information indicating that a first transmission configuration indicator (TCI) state associated with a first transmission and reception point (TRP) is activated and that a second TCI state associated with a second TRP is activated, wherein each one of the first TCI state and the second TCI state is applicable to a plurality of channels 1802

↓

Determining an activated TCI state to use in association with a communication on a channel of the plurality of channels by at least selecting the activated TCI state from the first TCI state and the second TCI state, wherein the communication includes a physical downlink shared channel (PDSCH) transmission to the UE or a physical uplink shared channel (PUSCH) transmission from the UE 1804

↓

Performing the communication based on the activated TCI state 1806

```
┌─────────────────────────────────────────────────────────────────────┐
│ Sending, to a user equipment (UE), first information indicating that a first │
│ transmission configuration indicator (TCI) state associated with a first │
│ transmission and reception point (TRP) is activated and that a second TCI │
│ state associated with a second TRP is activated, wherein each one of the │
│ first TCI state and the second TCI state is applicable to a plurality of │
│ channels 1902 │
└─────────────────────────────────────────────────────────────────────┘
                                    │
                                    ▼
┌─────────────────────────────────────────────────────────────────────┐
│ Sending, to the UE, second information indicating that an activated TCI │
│ state is to be used in association with a communication on a channel of the │
│ plurality of channels by at least selecting, wherein the second information │
│ causes the UE to select the activated TCI state from the first TCI state and │
│ the second TCI state, wherein the communication includes a physical │
│ downlink shared channel (PDSCH) transmission to the UE or a physical │
│ uplink shared channel (PUSCH) transmission from the UE 1904 │
└─────────────────────────────────────────────────────────────────────┘
                                    │
                                    ▼
┌─────────────────────────────────────────────────────────────────────┐
│                                                                     │
│ Performing the communication based on the activated TCI state 1906 │
│                                                                     │
└─────────────────────────────────────────────────────────────────────┘
```

```
┌─────────────────────────────────────────────────────────────────┐
│ Receiving information indicating that a first transmission       │
│ configuration indicator (TCI) state associated with a first      │
│ transmission and reception point (TRP) is activated and that a   │
│ second TCI state associated with a second TRP is activated,      │
│ wherein each one of the first TCI state and the second TCI       │
│ state is applicable to a plurality of channels 2002              │
└─────────────────────────────────────────────────────────────────┘
                                  │
                                  ▼
┌─────────────────────────────────────────────────────────────────┐
│ Determining an activated TCI state to use in association with    │
│ receiving a channel state information reference signal (CSI-RS)  │
│ resource to generate a channel state information (CSI) report,   │
│ wherein the activated TCI state corresponds to at least one of   │
│ the first TCI state or the second TCI state 2004                 │
└─────────────────────────────────────────────────────────────────┘
                                  │
                                  ▼
┌─────────────────────────────────────────────────────────────────┐
│ Generating the CSI report based on reception of the CSI-RS       │
│ resource using the activated TCI state 2006                      │
└─────────────────────────────────────────────────────────────────┘
```

```
Sending, to a user equipment (UE), first information indicating that a first
transmission configuration indicator (TCI) state associated with a first
transmission and reception point (TRP) is activated and that a second TCI
state associated with a second TRP is activated, wherein each one of the
first TCI state and the second TCI state is applicable to a plurality of
channels 2102
```

```
Sending, to the UE, second information indicating an activated TCI state to
use in association with receiving a channel state information reference
signal (CSI-RS) resource for a channel state information (CSI) report,
wherein the activated TCI state corresponds to at least one of the first TCI
state or the second TCI state 2104
```

```
Receiving, from the UE, the CSI report based on the activated TCI state
2106
```

FIG. 21

UNIFIED TRANSMISSION CONFIGURATION INDICATOR STATE SELECTION FOR PHYSICAL DOWNLINK SHARED CHANNEL OR PHYSICAL UPLINK SHARED CHANNEL TRANSMISSIONS

CROSS REFERENCE TO RELATED APPLICATIONS

The present application claims the benefit and priority under 35 U.S.C. 119(e) of U.S. Provisional Patent Application No. 63/396,168, filed Aug. 8, 2022, entitled, "UNIFIED TRANSMISSION CONFIGURATION INDICATOR STATE SELECTION FOR PHYSICAL DOWNLINK SHARED CHANNEL OR PHYSICAL UPLINK SHARED CHANNEL TRANSMISSIONS," the content of which is herein incorporated by reference in its entirety for all purposes.

BACKGROUND

Cellular communications can be defined in various standards to enable communications between a user equipment and a cellular network. For example, Fifth generation mobile network (5G) is a wireless standard that aims to improve upon various communication parameters including data throughput, reliability, availability, and more. Multiple transmission and reception points (TRPs) may be deployed to further improve such communication parameters.

BRIEF DESCRIPTION OF THE DRAWINGS

FIG. 5 illustrates another example of a rule-based use of unified TCI states, in accordance with some embodiments.

FIG. 18 illustrates an example of an operational flow/algorithmic structure implemented by a user equipment (UE) for using unified TCI states, in accordance with some embodiments.

FIG. 19 illustrates an example of an operational flow/algorithmic structure implemented by a network for using unified TCI states, in accordance with some embodiments.

FIG. 20 illustrates another example of an operational flow/algorithmic structure implemented by a UE for using unified TCI states, in accordance with some embodiments.

FIG. 21 illustrates another example of an operational flow/algorithmic structure implemented by a network for using unified TCI states, in accordance with some embodiments.

DETAILED DESCRIPTION

Figure 1:
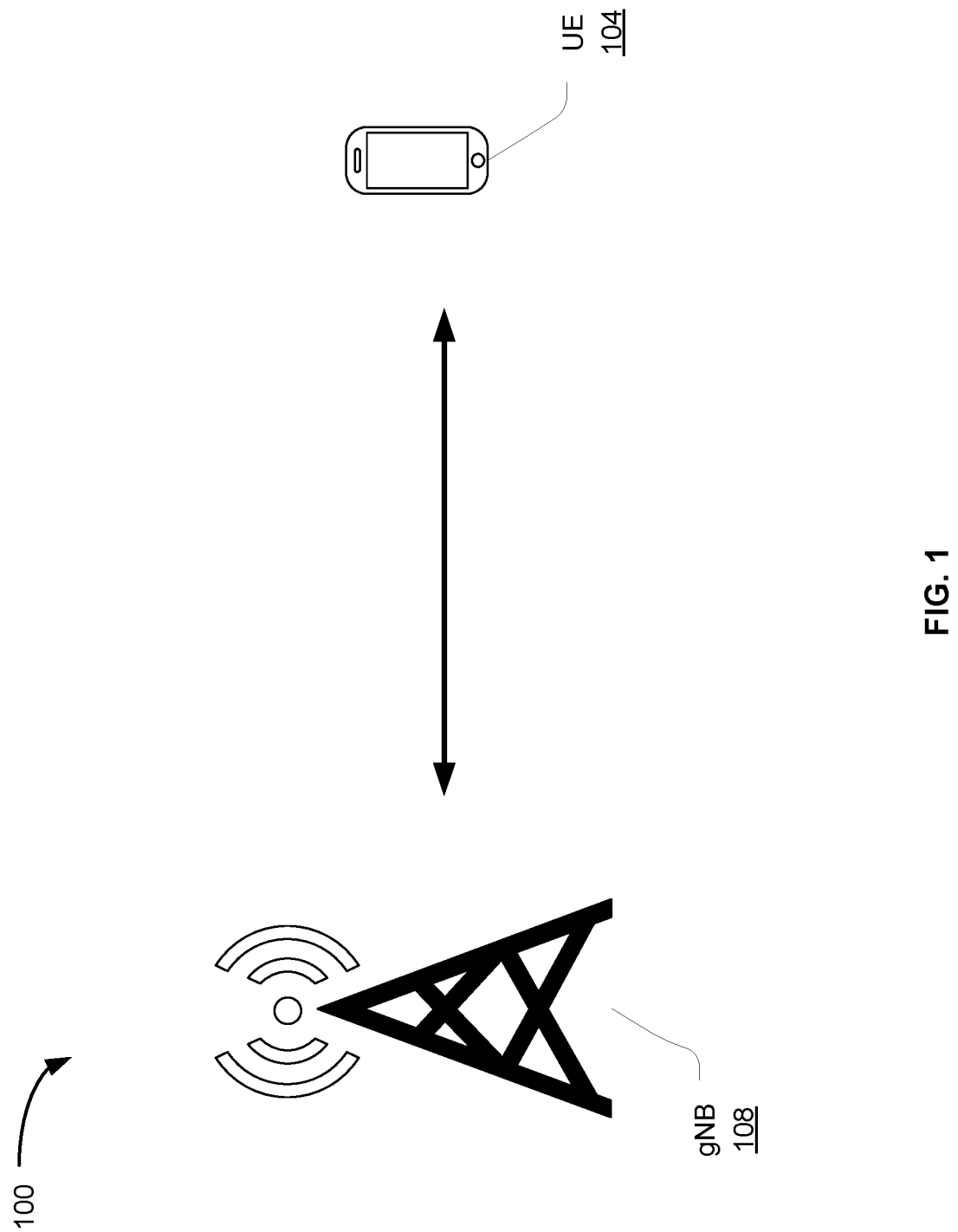
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art, having the benefit of the present disclosure, that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

A network may include multiple transmission and reception points (TRPs). A user equipment (UE) may communicate with multiple TRPs (e.g., two TRPs), where an ideal or a non-ideal backhaul may exist between such TRPs. The UE may also be configured to use multiple transmission configuration indicator (TCI) states, each of which may apply to a plurality of channels (e.g., on the downlink, to a physical downlink control channel, a physical downlink shared channel, a channel state indicator reference signal channel, a unicast channel, etc.). Such a TCI state may be referred to herein as a unified TCI state. A plurality of such unified TCI states may be activated. In this case, the UE may determine one or more of the activated unified TCI states to use for communications with the network (e.g., including for downlink transmissions to the UE from the TRPs and uplink transmissions of the UE to the TRPs, and including for CSI reporting). The determination can rely on a set of predefined rules that indicate a selection of the activated unified state(s)

to use. Alternatively, the determination can rely on signaling from the network. The signaling can include any or a combination of radio resource control (RRC) signaling, media access control (MAC) control element (CE) signaling, and downlink control information (DCI) signaling. In particular, the network can indicate the particular set of activated unified TCI states that the UE needs to use.

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The "user equipment" or "UE" as used herein refers to a device with radio communication capabilities and may describe a remote user of network resources in a communications network. The term "user equipment" or "UE" may be considered synonymous to, and may be referred to as, client, device, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The UE may have a primary function of communication with another UE or a network and the UE may be integrated with other devices and/or systems (e.g., in a vehicle).

The term "base station" as used herein refers to a device with radio communication capabilities, that is a device of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band (between 40 Megahertz (MHz) and 7,125 MHz) and/or frequency range 2 (FR2) band (between 24,250 MHz and 52,600 MHz). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

Although not illustrated in FIG. 1, the network environment 100 may further include additional base stations with which the UE 104 may also connect. An additional base station can support the same RAT as the gNB 108 (e.g., the base station is also a gNB) or a different RAT (e.g., Long-Term Evolution (LTE) eNB).

In an example, the UE 104 supports carrier aggregation (CA), whereby the UE 104 can connect and exchange data simultaneously over multiple component carriers (CCs) with the gNB 108. The CCs can belong to the same frequency band, in which case they are referred to as intra-band CCs. Intra-band CCs can be contiguous or non-contiguous. The CCs can also belong to different frequency bands, in which case they are referred to as inter-band CCs. A serving cell can be configured for the UE 104 to use a CC. A serving cell can be a primary (PCell), a primary secondary cell (PSCell), or a secondary cell (SCell). Multiple SCells can be activated via an SCell activation procedure where the component carriers of these serving cells can be intra-band contiguous, intra-band noon-contiguous, or inter-band. The serving cells can be collocated or non-collocated.

As further illustrated in the next figures, the network may also include multiple transmission and reception points (TRPs). A set of TRPs (e.g., two of them) can be managed by a same base station (e.g., gNB 108) or by different base stations. The UE 104 may communicate with the network by communication with the set of TRPs (e.g., this set acts as a radio access network (RAN)).

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread. In QCL Type C, antenna ports share Doppler shift and average delay. In QCL Type D, antenna ports share spatial receiver parameters.

The gNB 108 may provide TCI state information to the UE 104 to indicate QCL relationships between antenna ports used for reference signals (for example, synchronization signal/PBCH or CSI-RS), downlink data or control signaling, for example, PDSCH or PDCCH, and/or uplink data or control signaling, for example PUSCH or PUCCH. The gNB 108 may use a combination of RRC signaling, MAC control element signaling, and DCI to inform the UE 104 of these QCL relationships.

TCI states are configured for different channels, such as PDCCH, PDSCH, PUCCH, PUSCH, and CSI-RS channels, in order to convey the QCL indication for the respective reference signal (RS). In FR1 QCL Types A-C and in FR2 QCL types A-D are applicable. The QCL Type D for FR2 indicates that PDCCH/PDSCH/CSI-RS is transmitted with the same spatial filter as the reference signal associated with that TCI. In FR2, the network can indicate a transmit beam change by switching the TCI state.

The UE 104 may be configured with a TCI list for the channels via RRC. If a TCI state applies to multiple channels (e.g., on the downlink to PDCCH, PDSCH, and CSI-RS channels), this TCI state can be referred to as a unified TCI state. The network may activate one or more of the configured TCI states. The activation can be carried via RRC signaling, MAC CE, or DCI.

Figure 2:
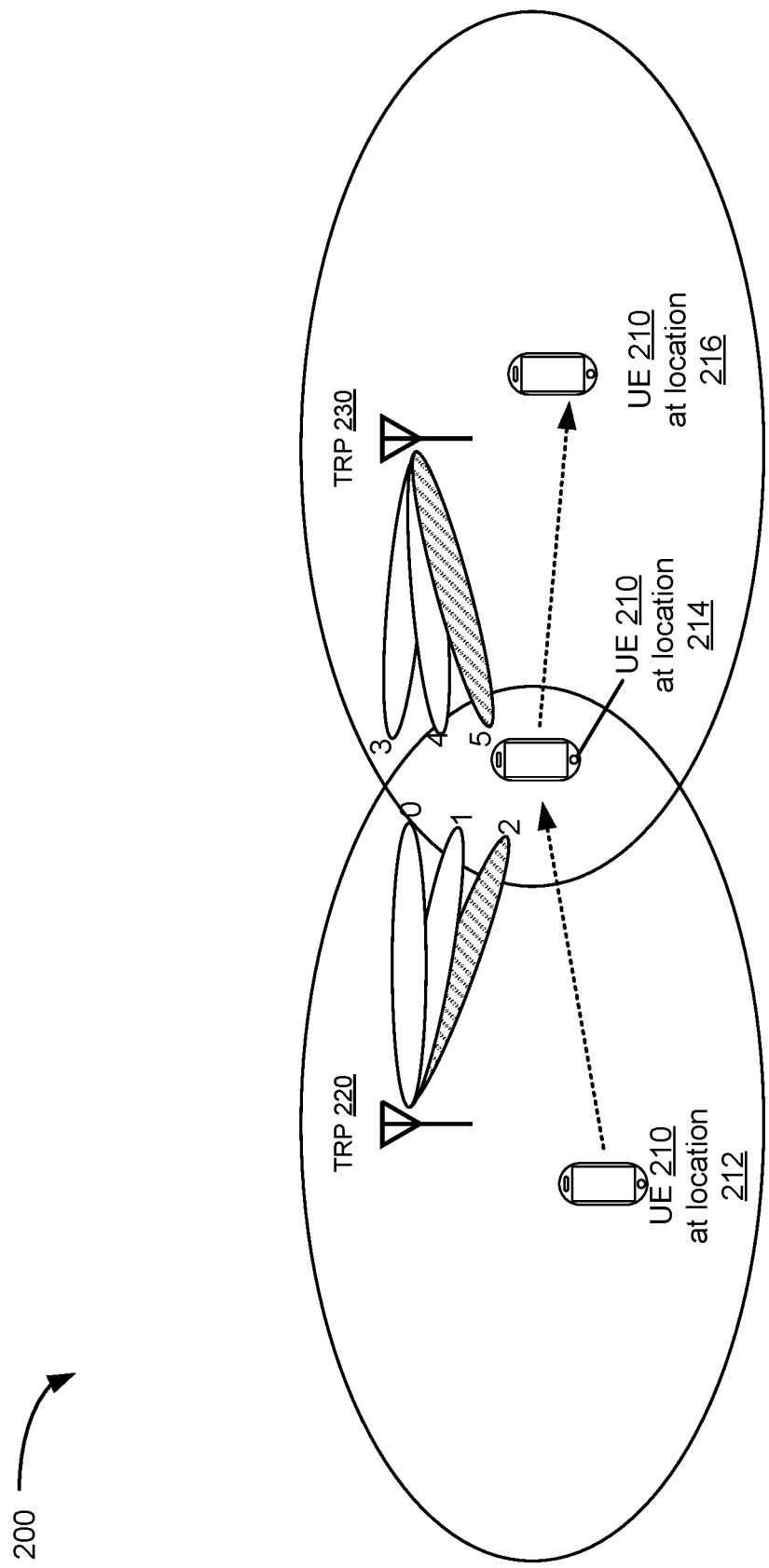
FIG. 2 illustrates an example of a multi-transmission and reception point (mTRP) network environment, in accordance with some embodiments.

FIG. 2 illustrates an example of a mTRP network environment 200, in accordance with some embodiments. A UE 210 can communicate with multiple TRPs of the mTRP environment 200. In the illustration of FIG. 2, the UE communicates with two TRPs of the mTRP environment 200: a first TRP 220 and a second TRP 230. However, the embodiments of the present disclosure are not limited as such. In particular, the UE can communicate with K TRPs of the mTRP environment 200, where K is a positive integer equal to or greater than two.

The TRPs 220 and 230 may be deployed at various geographical locations in support of, for instance, multiple-input, multiple-output (MIMO) technology, may be coupled to one or more base stations (e.g., gNBs), and may be associated with one or more cells. The TRPs 220 and 230 may directly communicate with the UE 210 over the air, whereby these TRPs 220 and 230 may be clustered to communicate with the UE 210. For example, one or more base stations may coordinate with each other to schedule a TRP cluster to serve a downlink transmission to the UE 210.

Each one of the TRPs 220 and 230 can be configured as a macro-cell, a small cell, a pico-cell, a femto-cell, a remote radio head, a relay node, etc. An ideal backhaul may exist between the TRPs 220 and 230. In this case, single DCI (sDCI) may be used for controlling the communications (at least on the downlink) with the UE 210. Alternatively, a non-ideal backhaul may exist between the TRPs 220 and 230. In this case, multiple DCI (mDCI) may be used for controlling the communications (at least on the downlink) with the UE 210.

Different types of downlink and uplink channels can exist between each one of the TRPs 220 and 230 and the UE 210. For example, on the downlink, a PDCCH, a PDSCH, a CSI-RS channel, and a unicast channel can exist between the TRP 220 and the UE 210, and similarly between the TRP 230 and the UE 210. As part of a unified TCI framework to reduce the overhead related to TCI states, a TCI state can be activated for the different downlink channels or for the different uplink channels. For downlink, such a TCI state can be referred to as a unified downlink TCI state. For uplink, such a TCI state can be referred to as a unified uplink TCI state. In the interest of brevity, a unified TCI state can refer herein to a unified downlink TCI state or a unified uplink TCI state. Upon activation, the unified TCI state can be referred to as an activated unified TCI state (or, for conciseness herein, as an activated TCI state).

In the case of mTRP, at least one unified TCI state pair can be activated per TRP: <one unified DL TCI state $\#i_1$, one unified UL TCI state $\#j_1$>. In other words, in the case of K TRPs (e.g., "K=2" as in FIG. 2), at least K unified TCI state pairs can be activated. In the particular illustration of FIG. 2, a first unified TCI pair can be activated for the first TRP 220: <one unified DL TCI state $\#i_1$, one unified UL TCI state $\#j_1$>, and a second unified TCI pair can be activated for the second TRP 230: <one unified DL TCI state $\#i_2$, one unified UL TCI state $\#j_2$>.

As further illustrated in FIG. 2, the UE's 210 location can change over time. Depending on its location, the UE's 210 communication with the TRPs 220 and 230 can change and such change can impact the active TCI state(s) that need to be used. For example, when the UE 210 is at a first location 212, the UE 212 can be within the cell coverage of the first TRP 220 but not the second TRP 230. As such, at this location 212, the use of an activated unified TCI state pair associated with the first TRP 220 but not the second TRP 230 may be needed. Subsequently, the UE 210 can be moved to a second location 214 having an overlapping cell coverage of both the first TRP 220 and the second TRP 230. At this location 214, the use of two activated unified TCI state pairs, one associated with the first TRP 220 and the other one associated with the second TRP 230 may be needed. Thereafter, the UE 210 can be moved to a third location 216 having a cell coverage of only the second TRP 230. At this location 216, the use of one activated unified TCI state pair associated with the second TRP 230 but not the first TRP 220 may be needed. Note that, for each TRP, the activated unified TCI pair can change with the location. For instance, at locations 212 and 214, two different activated unified TCI state pairs may be used in association with the first TRP 220: <one unified DL TCI state $\#i_1$, one unified UL TCI state $\#j_1$> for the first location 212 and <one unified DL TCI state $\#k_1$, one unified UL TCI state $\#l_1$> for the second location 214.

The specific unified TCI state to activate for downlink or uplink can be indicated to the UE 210 via RRC signaling, MAC CE, or DCI. Additionally or alternatively, the UE 210 can determine the specific unified TCI state based on a set of predefined rules. These and other functionalities for determining and using unified TCI states are further described herein next.

Figure 3:
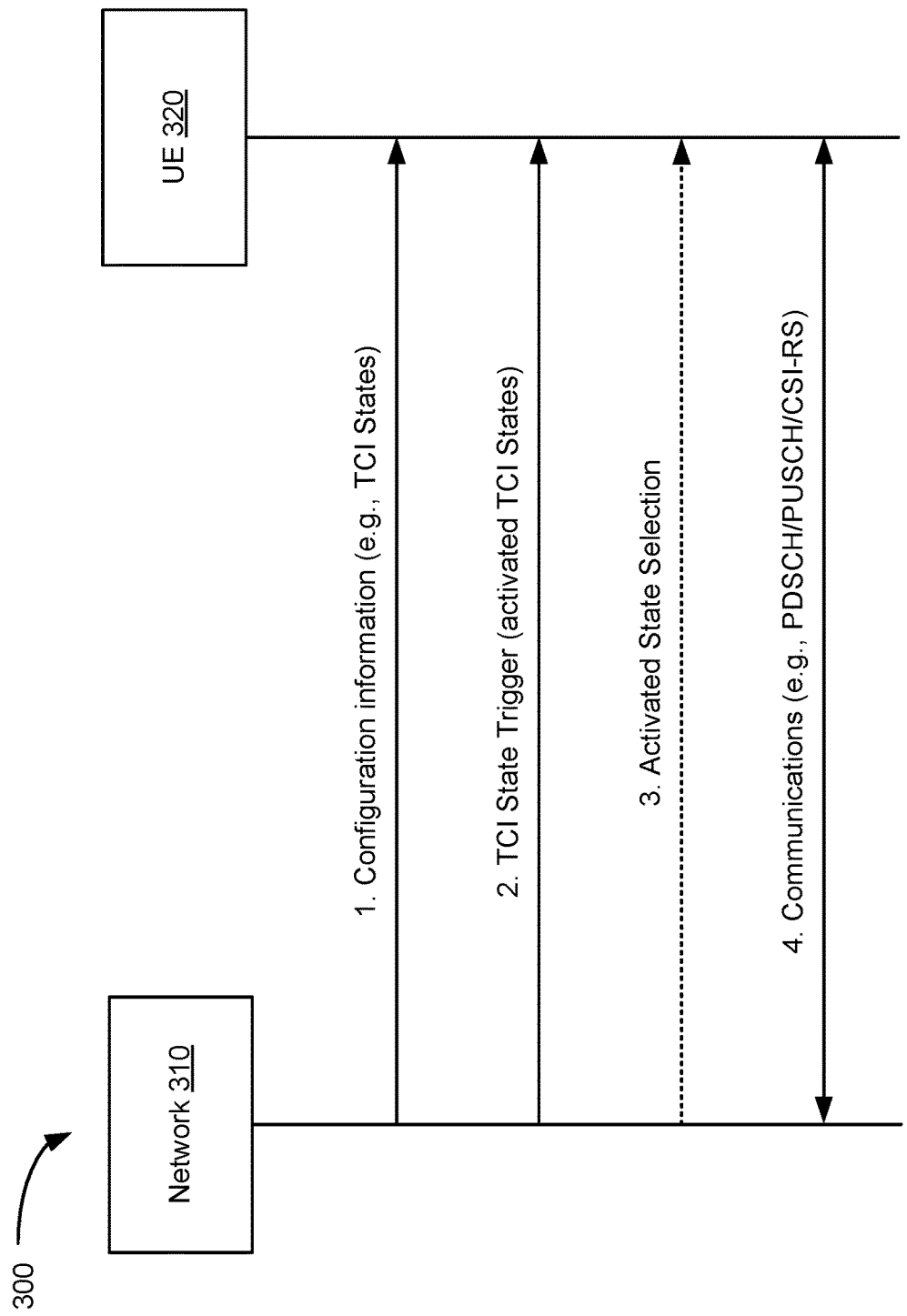
FIG. 3 illustrates an example of a sequence diagram for using unified transmission configuration indicator (TCI) states, in accordance with some embodiments.

FIG. 3 illustrates an example of a sequence diagram 300 for using unified TCI states, in accordance with some embodiments. In particular, a network 310 may include K TRPs and a UE 32 may communicate with the network via the K TRPs, where K is a positive integer equal to or greater than two. In a first step of the sequence diagram 300, the network 310 can send configuration information to the UE 320. The configuration information can indicate a plurality of TCI states that are configured by the network 310 for the UE 32. These TCI states can be unified TCI states and can be configured in pairs, where each pair corresponds to a unified downlink TCI state and a unified uplink TCI state and is associated with one of the K TRPs. Each one of the K TRPs can be associated with multiple unified TCI state pairs. The configuration information can be sent via RRC signaling. At this point, the TCI states are configured but not yet activated yet.

Next in the sequence diagram 300, the network 310 can send TCI state trigger information to the UE 320. This information can activate some or all of the unified TCI state pairs. The trigger information can be sent via RRC signaling, MAC CE, or DCI. For each TRP, at lease on unified TCI state pair can be activated.

Thereafter, the UE 320 can determine a set of the activated unified TCI state pairs to use when communicating with one or more of the K TRPs. In an example, this determination is based on a set of pre-defined rules that the UE 320 stores, whereby the UE 320 can execute program code that processes the rules to define the activated unified TCI state pair(s) to use. In another example, and as illustrated with the dotted arrow, the network 310 can send to the UE 320 selection information indicating the activated unified TCI state pair(s) to use. This information can be sent via RRC signaling, MAC CE, or DCI. For each TRP, at least one unified TCI state pair can be activated.

Once the activated unified TCI state pair(s) to use are determined, the UE 320 can communicate with the network 310 accordingly. For example, in the case of PDSCH, the UE 320 can use a first activated unified downlink TCI state for a PDSCH transmission from a TRP. In the case of PUSCH, the UE 320 can use a first activated unified uplink TCI state for a PUSCH transmission to the TRP. In the case of CSI-RS, the UE 320 can use the first activated unified downlink TCI state for CSI-RS transmission from the TRP to the UE 320 such that the UE 320 can generate a CSI report.

In the next figures, various embodiments are described in connection with two activated unified TCI state pairs: one for a first TRP and one for a second TRP. Generally, two bits (or less) may be used to indicate whether only the first activated unified TCI state pair is to be used, whether only the second activated unified TCI state pair is to be used, or whether both the first and second activated unified TCI state pairs are to be used. However, the embodiments are not limited as such and similarly apply to more than two activated unified TCI state pairs. When more than two activated unified TCI state pairs, more than two bits may be used to indicate the activated unified TCI state pairs to use. For instance, in case of three activated unified TCI state pairs, three bits may be used.

Further, in the interest of clarity of explanation, various embodiments are described in connection with downlink communications, where downlink unified TCI states are used. However, the embodiments equivalently apply to uplink communications, where uplink unified TCI states are used, and to downlink and uplink communications, where unified TCI state pairs are used.

Figure 4:
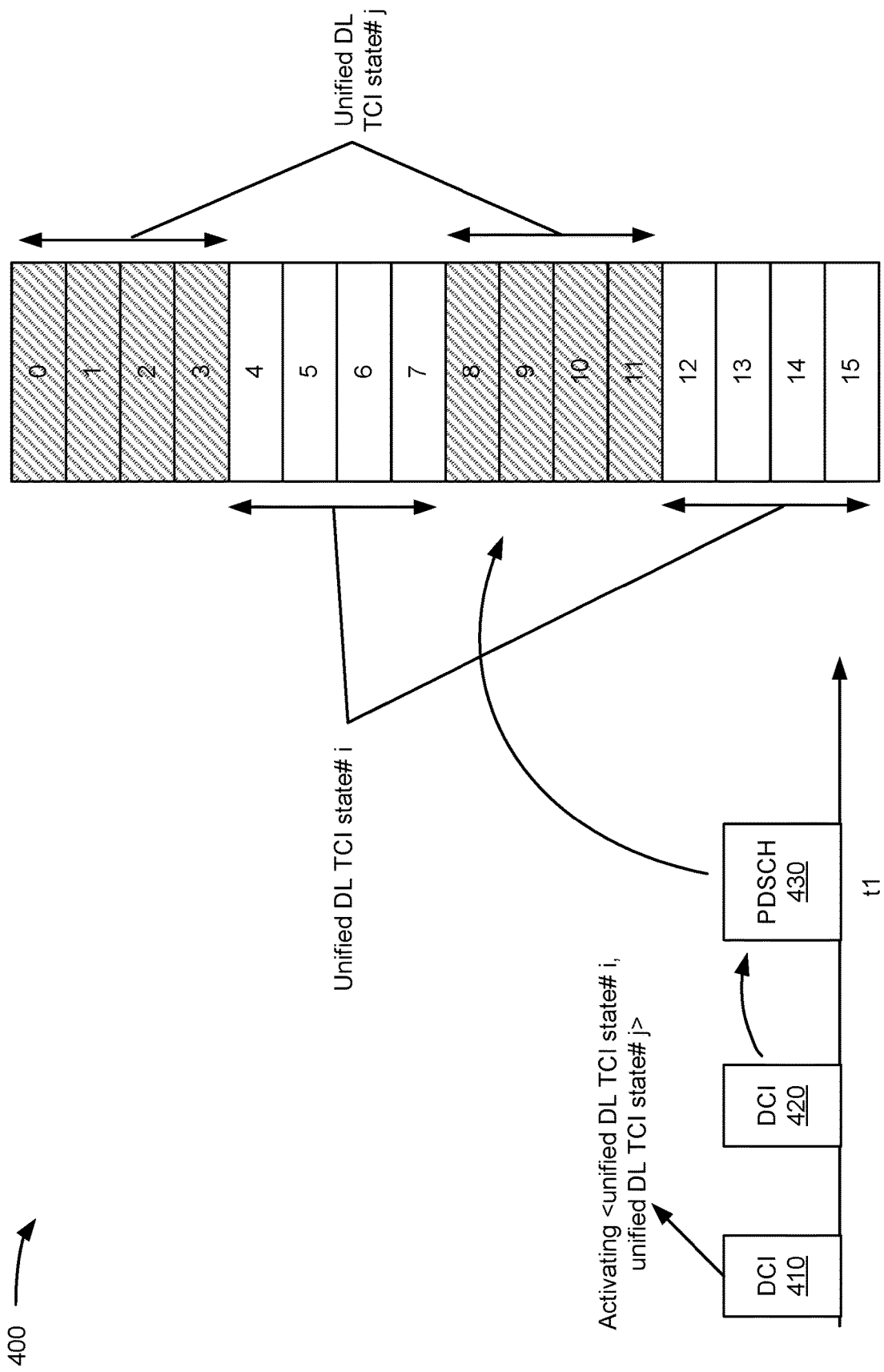
FIG. 4 illustrates an example of a rule-based use of unified TCI states, in accordance with some embodiments.

FIG. 4 illustrates an example 400 of a rule-based use of unified TCI states, in accordance with some embodiments. Generally, a UE can store a set of rules. Upon a communication being scheduled, the UE can determine, based on the set of rules, one or more of activated unified TCI states to use. In the illustration of FIG. 4, a PDSCH transmission to the UE is illustrated. However, the example 400 equivalently applies to a PUSCH transmission from the UE.

In the example 400, two unified downlink TCI states are activated for the UE: a "unified DL TCI state #i" that is associated with a first TRP (e.g., the TRP 220 of FIG. 2) and a "unified DL TCI state #j" that is associated with a second TRP (e.g., the TRP 230 of FIG. 2). The set of rules can indicate an implicit mapping of which one (or maybe both) of two unified downlink TCI states to use for the PDSCH transmission. This implicit mapping can depend on a transmission scheme used in the mTRP environment, such as whether an fdmScheme A, an fdmScheme B, an tdmSchemA, an tdmScheme B, or a spatial division multiplexing (SDM) scheme is used. In the case of the fdmScheme B, the tdmSchemA, the tdmScheme B, or the SDM scheme being used, the set of rules can indicate that the first unified downlink TCI state (e.g., the "unified DL TCI state #i", or equivalently a first unified UL TCI state or a first unified TCI state pair) is applied to the first PDSCH transmission occasion (or equivalently, to a first PUSCH transmission or first PDSCH and PUSCH transmission occasions). The set of rules can also indicate that the second unified downlink TCI state (e.g., the "unified DL TCI state #j", or equivalently a second unified UL TCI state or a second unified TCI state pair) is applied to the second PDSCH transmission occasion (or equivalently, to a second PUSCH transmission or second PDSCH and PUSCH transmission occasions).

In the case of fdmSchemeA, a single PDSCH transmission occasion (or, similarly, a second PUSCH transmission occasion) may be scheduled. In this case, rather than being specific to a transmission occasion, the set of rules is specific to frequency domain resource allocations. In particular, the set of rules can indicate that the first unified downlink TCI state (e.g., the "unified DL TCI state #i", or equivalently the first unified UL TCI state or the first unified TCI state pair) is applied to a first frequency domain allocation. The set of rules can also indicate that the second unified downlink TCI state (e.g., the "unified DL TCI state #j", or equivalently the second unified UL TCI state or the second unified TCI state pair) is applied to a second frequency domain allocation. The first frequency domain allocation and the second frequency domain allocation can be non-overlapping in the frequency domain.

Referring to the particular illustration of FIG. 4, an fdmScheme B is illustrated. First DCI 410 can activate the two downlink TCI states. Second DCI 420 is received and schedules a PDSCH transmission 430 to the UE. This transmission 430 involves sixteen physical resource blocks (PRBs) at a time "t1." The UE applies the set of rules and determines that the first unified downlink TCI state (e.g., the "unified DL TCI state #i") is to be applied to the first PDSCH occasion, and that the second unified downlink TCI state (e.g., the "unified DL TCI state #j") is to be applied to the second PDSCH occasion, and this pattern repeats in the frequency domain. The first PDSCH transmission occasion corresponds to the first four PRBs forming an even physical resource group (PRG), whereas the second PDSCH transmission occasion corresponds to the next four PRBs forming an odd PRG, and this pattern repeats (e.g., even and odd PRGs). Accordingly, the UE uses the first unified downlink TCI state (e.g., the "unified DL TCI state #i") for the even PRGs (e.g., the PDSCH transmission on PRBs "0" through "3" and "8" through "11") that corresponds to a first PDSCH (e.g., a PDSCH with the first TRP). The UE also uses the second unified downlink TCI state (e.g., the "unified DL TCI state #i") for the odd PRPGs (e.g., the PDSCH transmission on PRBs "4" through "7" and "12" through "15") that corresponds to a second PDSCH (e.g., a PDSCH with the second TRP).

FIG. 5 illustrates another example 500 of a rule-based use of unified TCI states, in accordance with some embodiments. Here, the same set of rules as the one described in FIG. 4 is used. Nonetheless, a time division multiplexing (TDM) scheme is illustrated. The set of rules can indicate whether a cycling mapping 510 or a sequential mapping 520 is to be used. The cycling mapping 510 corresponds to the activated TCI state changing from one PDSCH transmission occasion to the next one over time. The sequential mapping 520 corresponds to the activated TCI state applying to a plurality of PDSCH transmission occasions before changing to the next plurality of PDSCH transmission occasions.

Figure 6:
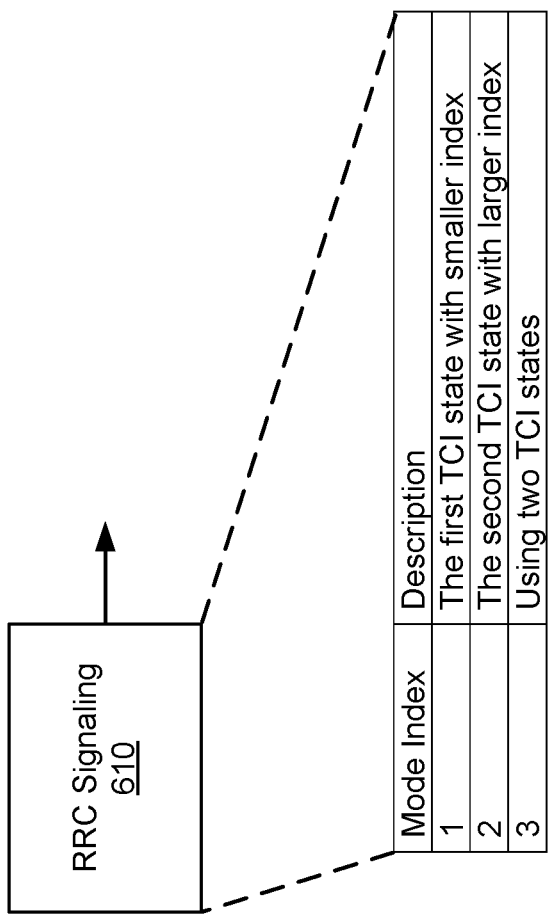
FIG. 6 illustrates an example of a radio resource control (RRC)-based use of unified TCI states, in accordance with some embodiments.

The example 500 illustrates four transmission occasions (shown as rectangles). In addition, the first unified downlink TCI state (e.g., the "unified DL TCI state #i") and the second unified downlink TCI state (e.g., the "unified DL TCI state #j") are activated. In this example, if the set of rules indicates the cycling mapping 510, the first unified downlink TCI state (e.g., the "unified DL TCI state #i") applies to the first and third PDSCH transmission occasions. In comparison, the second unified downlink TCI state (e.g., the "unified DL TCI state #j") applies to the second and fourth PDSCH transmission occasions. If the set of rules indicates the sequential mapping 520, the first unified downlink TCI state (e.g., the "unified DL TCI state #i") applies to the first and second PDSCH transmission occasions. In comparison, the second unified downlink TCI state (e.g., the "unified DL TCI state #j") applies to the third and fourth PDSCH transmission occasions FIG. 6 illustrates an example of a RRC-based use of unified TCI states, in accordance with some embodiments. A network can send RRC signaling 610 (e.g., one or more RRC messages) to a UE to indicate a selection of activated unified TCI states to use for PDSCH and/or PUSCH transmission. Here also, reference is made to the first unified downlink TCI state (e.g., the "unified DL TCI state #i") and the second unified downlink TCI state (e.g., the "unified DL TCI state #j").

The UE can store a table (or use some other data structure) that associates a mode index with an activated unified downlink TCI state selection. The table can be defined based on other RRC signaling or can be predefined based on a technical specification with which the UE complies. In particular, a first mode index (e.g., mode index "1") can correspond to a selection of the first unified downlink TCI state (e.g., the "unified DL TCI state #i"). A second mode index (e.g., mode index "2") can correspond to a selection of the second unified downlink TCI state (e.g., the "unified DL TCI state #j"). A third mode index (e.g., mode index "3") can correspond to a selection of both the first unified downlink TCI state (e.g., the "unified DL TCI state #i) and the second unified downlink TCI state (e.g., the "unified DL TCI state #j").

The RRC signaling 610 can indicate a particular mode index (e.g., by including two bits set to indicate a value of "1," "2," or "3"). The UE can then look up the table (or the used data structure) to determine the activated unified downlink TCI state(s) associated with the mode index. If the RRC signaling 610 indicates mode index "1," the UE applies the first unified downlink TCI state (e.g., the "unified DL TCI state #i") to the PDSCH transmissions. If the RRC signaling 610 indicates mode index "2," the UE applies the second unified downlink TCI state (e.g., the "unified DL TCI state #j") to the PDSCH transmissions. If the RRC signaling 610 indicates mode index "3," the UE applies the first and second unified downlink TCI states (e.g., the "unified DL TCI state #i" and "unified DL TCI state #j") to the PDSCH transmissions. In the mode index "3" case, the set of rules discussed in connection with FIGS. 4 and 5 can be used to determine the particular unified downlink TCI state to use for each transmission occasion (or non-overlapping frequency domain resource allocation in the case of fdmScheme A).

For uplink PUSCH transmission, the same table (or data structure) described herein above can also indicate the unified uplink TCI state(s) to use. For instance, mode index "1" would correspond to a first activated unified TCI state pair, mode index "2" would correspond to a second activated unified TCI state pair, and mode index "3" to both the first and second activated unified TCI state pairs.

For more than two TRPs, the table (or data structure) described herein above can include additional entries that associate additional mode entries with additional activated unified downlink and/or uplink TCI states. For instance, a third unified downlink TCI state (e.g., the "unified DL TCI state #k") may be associated with a third TRP. In this case, the table can associate seven mode indices with an individual use of the first unified downlink TCI state, an individual use of the second unified downlink TCI state, an individual use of the third unified downlink TCI state, a combined uses of the first and second unified downlink TCI states, a combined uses of the first and third unified downlink TCI states, a combined uses of the second and third unified downlink TCI states, and a combined used of the first, second, and third unified downlink TCI states. The RRC signaling 610 can use three bits to indicate one of the seven mode indices.

Figure 7:
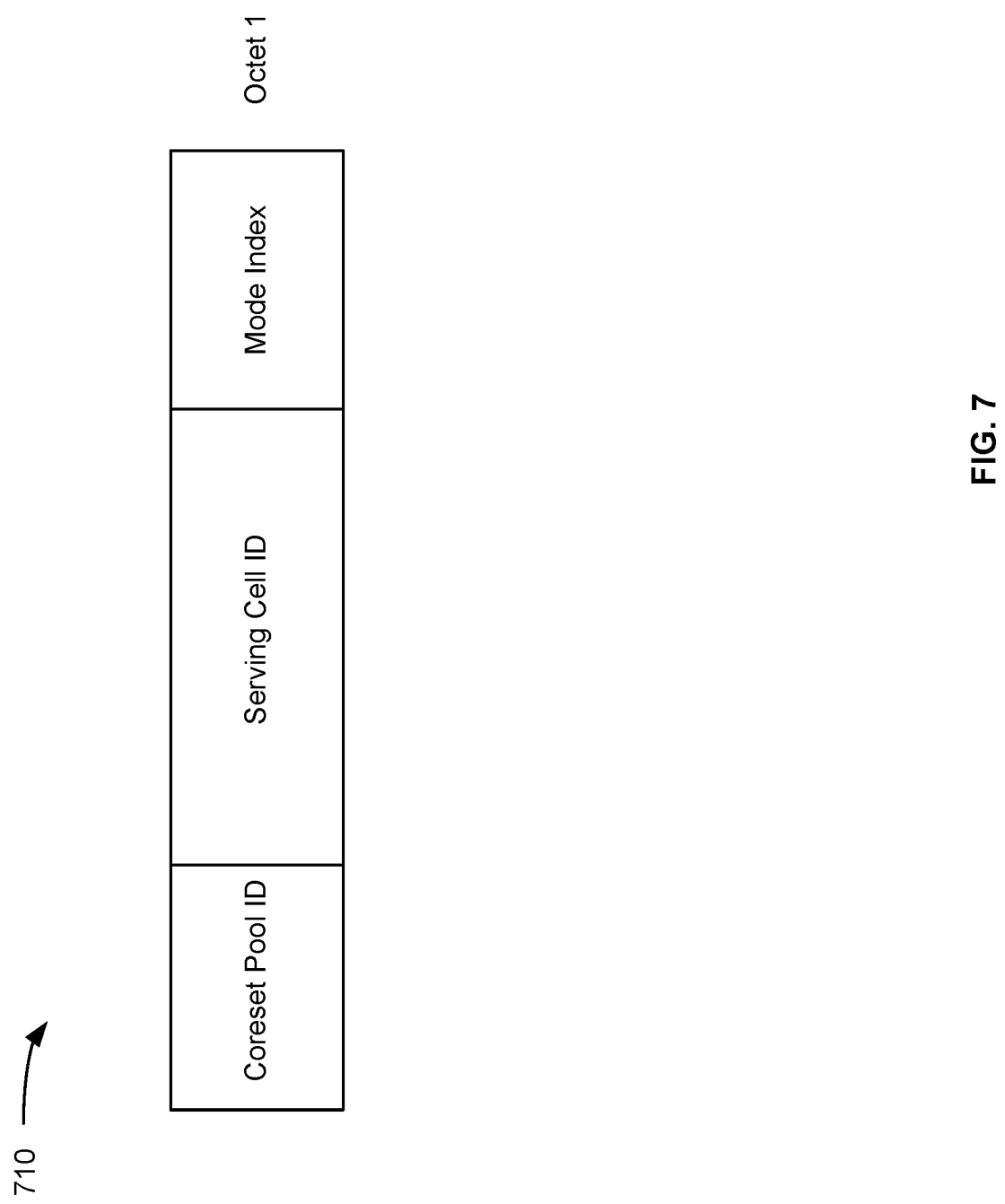
FIG. 7 illustrates an example of a media access control (MAC) control element (CE)-based use of unified TCI states, in accordance with some embodiments.

FIG. 7 illustrates an example of a MAC CE-based use of unified TCI states, in accordance with some embodiments. A network can send a MAC CE to a UE to indicate a selection of activated unified TCI states to use for PDSCH and/or PUSCH transmission. Here also, reference is made to the first unified downlink TCI state (e.g., the "unified DL TCI state #i") and the second unified downlink TCI state (e.g., the "unified DL TCI state #j").

The UE can store a table (or use some other data structure) that associates a mode index with an activated unified downlink TCI state selection. The table can be defined based on other RRC signaling or can be predefined based on a technical specification with which the UE complies. In particular, a first mode index (e.g., mode index "1") can correspond to a selection of the first unified downlink TCI state (e.g., the "unified DL TCI state #i"). A second mode index (e.g., mode index "2") can correspond to a selection of the second unified downlink TCI state (e.g., the "unified DL TCI state #j"). A third mode index (e.g., mode index "3") can correspond to a selection of both the first unified downlink TCI state (e.g., the "unified DL TCI state #i) and the second unified downlink TCI state (e.g., the "unified DL TCI state #j").

The MAC CE 710 can indicate a particular mode index (e.g., by including two bits set to indicate a value of "1," "2," or "3"). The UE can then look up the table (or the used data structure) to determine the activated unified downlink TCI state(s) associated with the mode index. If the MAC CE 710 indicates mode index "1," the UE applies the first unified downlink TCI state (e.g., the "unified DL TCI state #i") to the PDSCH transmissions. If the MAC CE 710 indicates mode index "2," the UE applies the second unified downlink TCI state (e.g., the "unified DL TCI state #j") to the PDSCH transmissions. If the MAC CE 710 indicates mode index "3," the UE applies the first and second unified downlink TCI states (e.g., the "unified DL TCI state #i" and "unified DL TCI state #j") to the PDSCH transmissions. In the mode index "3" case, the set of rules discussed in connection with FIGS. 4 and 5 can be used to determine the particular unified downlink TCI state to use for each transmission occasion (or non-overlapping frequency domain resource allocation in the case of fdmScheme A).

The MAC CE 710 can be identified by a MAC subheader with a logical channel identifier (LCID) indicating that the MAC CE 710 is for an activated TCI state(s) selection. As illustrated in FIG. 7, the MAC CE 710 can have a fixed size (e.g., one octet) and includes a plurality of fields. A first field can be a serving cell identifier field that indicates the identity of the serving cell for which the MAC CE 710 applies. A second field can be a coreset pool index. This field indicates the selected TCI state(s) for PDSCH is specific to the PDSCH scheduled by DCI in a CORESET that is configured with a specific CORESETPoolIndex. This field may be needed for mDCI in mTRP case only. It can be reserved for sDCI in an mTRP case. A third field can be a mode index field that indicates the index value of TCI state mapping mode (e.g., a mode index in the table described herein above that includes three mode indices). For instance, the 'Mode Index' is set to '00' to indicate first unified downlink TCI state (e.g., the "unified DL TCI state #i") for a given PDSCH reception.

For uplink PUSCH transmission, the same MAC CE 710 or another MAC CE can also indicate the unified uplink TCI state(s) to use. For more than two TRPs, the mode index field in the MAC CE can be a relatively longer field to indicate one of the possible mode indices (e.g., three bits to indicate one of the seven possible mode indices in the use case of three TRPs).

The use of both RRC signaling and MA CE allows additional flexibility relative to the use of only the pre-defined rules. Additional flexibility can also be possible by using DCI to indicate a unified TCI state(s) selection. The DCI can, but need not, schedule a PDSCH or PUSCH transmission. The same DCI or different DCI can be used to activate multiple unified TCI states. In the interest of clarity of explanation, various DCI examples are described herein next in connection with PDSCH transmission to a UE (e.g., a DCI having a format 1_1 or 1_2). However, the embodiments equivalently apply to PUSCH transmission from the UE (e.g., a DCI having format 0_1 or 0_2).

Figure 8:
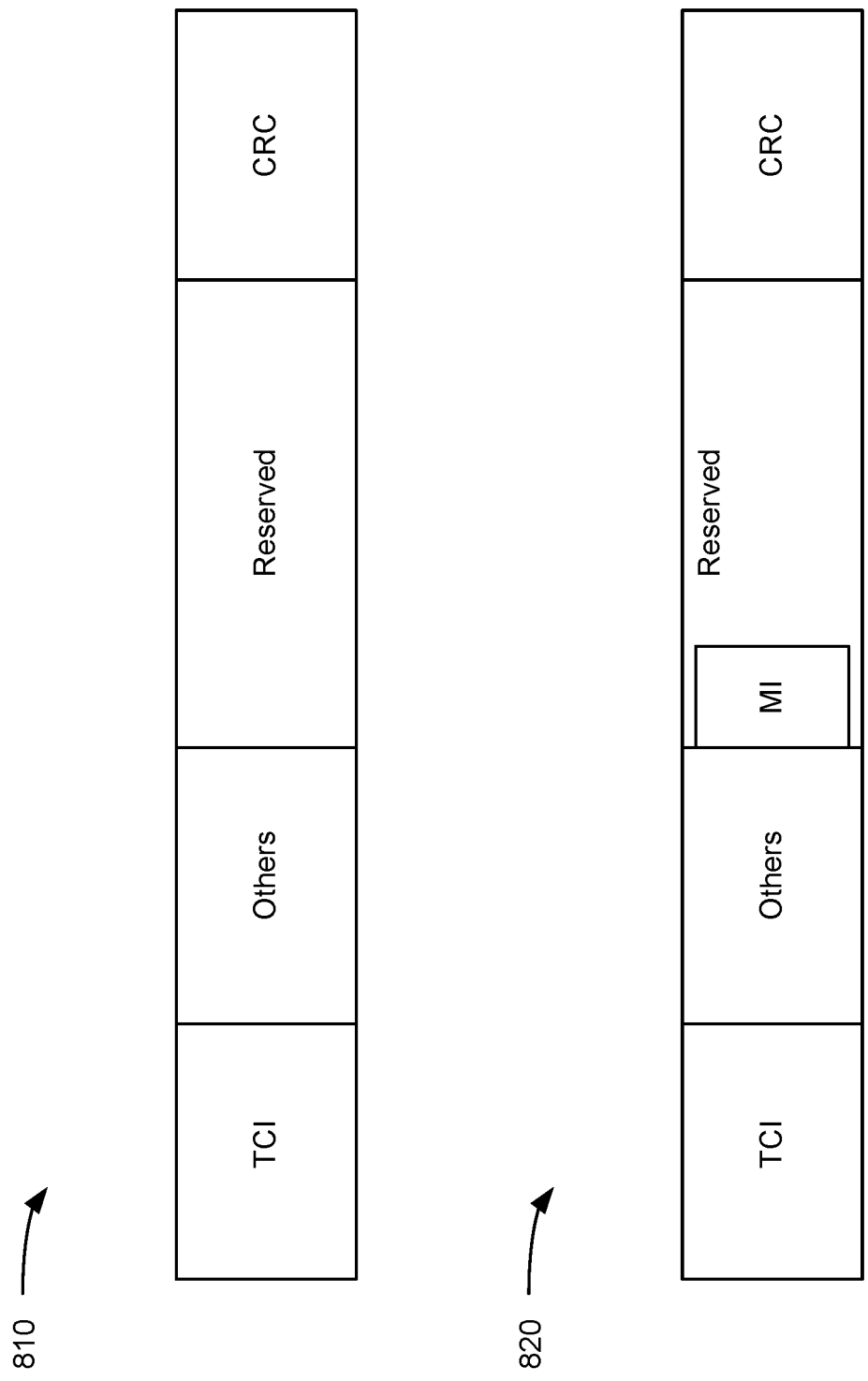
FIG. 8 illustrates an example of a downlink control information (DCI)-based use of unified TCI states, in accordance with some embodiments.

FIG. 8 illustrates an example of a DCI-based use of unified TCI states, in accordance with some embodiments. As illustrated, a network can send DCI 810 to a UE for a PDSCH reception. This DCI 810 may be an sDCI in a mTRP use case. The DCI 810 can have a format 1_1 or 1_2 and may be used without a scheduled PDSCH transmission to the UE (or, equivalently, PDSCH reception by the UE). In this case, the DCI format may include a TCI field, an others field, a reserved field, and a CRC field. The TCI sate field may be three bit long and its value may indicate a number of unified downlink TCI states that are activated.

Some of the reserved bits can be re-purposed to indicate an activated TCI state(s) selection. This bit re-purposing is illustrated as DCI 820. In particular, the DCI 820 can have a format 1_1 or 1_2 that includes a three-bit TCI field, an others field, a reserved field, and a CRC field. Within the reserved field, M bits are re-purposed to indicate a mode index. The UE can store a table (or some other data structure) that associates mode indices with possible activated TCI state(s) selections, similar to the table described herein above that includes three mode indices (e.g., for two TRPs) or seven mode indices (e.g., for three TRPs). The UE can determine the value indicated by the M bits and use this value in a look-up of the table (or the data structure). In the case of three mode indices, M can be two. In the case of seven mode indices, M can be three.

Figure 9:
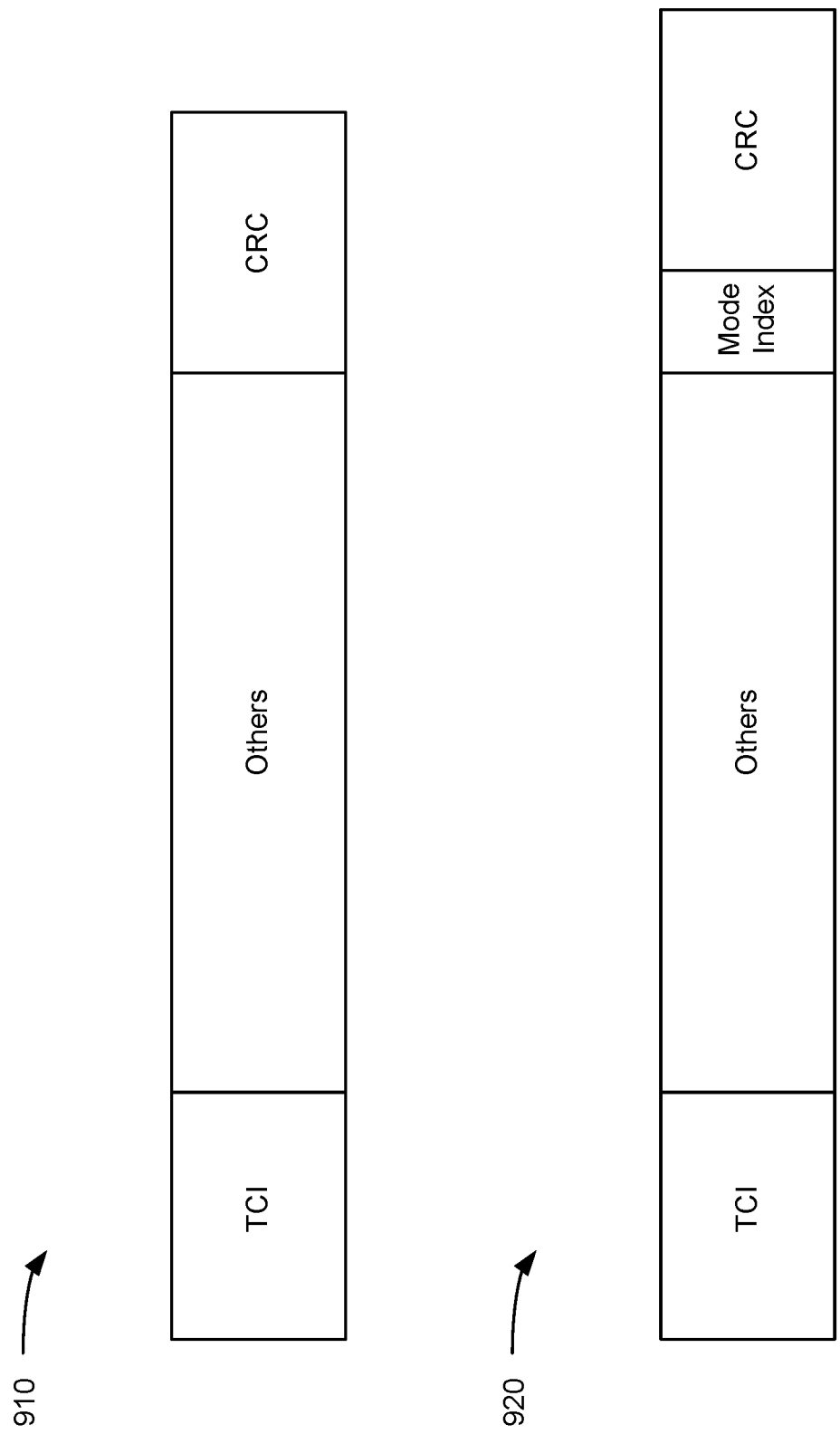
FIG. 9 illustrates another example of a DCI-based use of unified TCI states, in accordance with some embodiments.

FIG. 9 illustrates another example of a DCI-based use of unified TCI states, in accordance with some embodiments. As illustrated, a network can send DCI 910 to a UE for a PDSCH reception. This DCI 910 may be an sDCI in a mTRP use case. The DCI 910 can have a format 1_1 or 1_2 and may be used for scheduling a PDSCH transmission to the UE (or, equivalently, PDSCH reception by the UE). In this case, the DCI format may include a TCI field, others field, and a CRC field. The TCI sate field may be three bit long and its value may indicate a number of unified downlink TCI states that are activated.

Additional bits can be added for a mode index field to indicate an activated TCI state(s) selection. This bit addition is illustrated as DCI 920. In particular, the DCI 920 can have a format 1_1 or 1_2 that includes a three-bit TCI field, an others field, a mode index field, and a CRC field. The mode index field can include Mbits that indicate a mode index. The UE can store a table (or some other data structure) that associates mode indices with possible activated TCI state(s) selections, similar to the table described herein above that includes three mode indices (e.g., for two TRPs) or seven mode indices (e.g., for three TRPs). The UE can determine the value indicated by the Mbits and use this value in a look-up of the table (or the data structure). In the case of three mode indices, M can be two. In the case of seven mode indices, M can be three.

Figure 10:
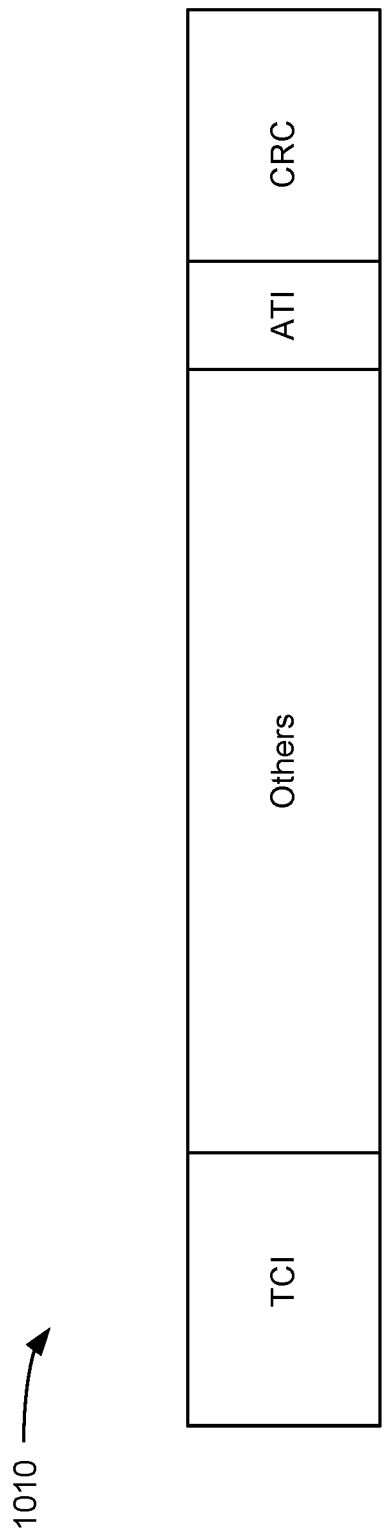
FIG. 10 illustrates yet another example of a DCI-based use of unified TCI states, in accordance with some embodiments.

FIG. 10 illustrates yet another example of a DCI-based use of unified TCI states, in accordance with some embodiments. A UE can store a table (or some other data structure) that associates mode indices with possible activated TCI state(s) selections, similar to the table described herein above that includes three mode indices (e.g., for two TRPs) or seven mode indices (e.g., for three TRPs). Further, the UE can use by default one of the activated TCI states. For instance, referring back to the first and second unified downlink TCI states (e.g., the "unified DL TCI state #i" and "unified DL TCI state #j"), by default, the first unified downlink TCI state (e.g., the "unified DL TCI state #i") is selected for use. In this case, DIC can indicate whether the second "unified DL TCI state #j") should also be selected. This first unified downlink TCI state can also be used for the scheduling PDCCH so that to align the TCI between the scheduling PDCCH and the scheduled PDSCH.

In particular, a network can send DCI 1010 to the UE for a PDSCH reception. This DCI 1010 may be an sDCI in a mTRP use case. The DCI 1010 can have a format 1_1 or 1_2 and may be used for scheduling a PDSCH transmission to the UE (or, equivalently, PDSCH reception by the UE). In this case, the DCI format may include a TCI field, others field, and a CRC field. The TCI sate field may be three bit long and its value may indicate a number of unified downlink TCI states that are activated.

One additional bit can be added for an additional TCI indicator (ATI) field to indicate whether to apply the second unified TCI state that is not used by the scheduling PDCCH when two joint downlink TCI States are activated/indicated (e.g., by the TCI field). The default unified TCI State used by the scheduling PDCCH is also used for the scheduled PDSCH to align the TCI between PDCCH and scheduled PDSCH. If the ATI field's bit is set to zero, no other activated unified TCI state is selected. Otherwise, the second "unified DL TCI state #j" is also selected.

Of course, if the table includes more than three mode indices (e.g., seven in the case of three TRPs), the ATI field can be more than one-bit long. For instance, in the case of three TRPs, the ATI field can be two-bit long.

Although FIG. 10 shows a DCI format used for scheduling, the ATI field can be also be included in a DCI format used without a scheduled PDSCH transmission. Such DCI format would include a reserved field, similar to the illustration of FIG. 8.

Figure 11:
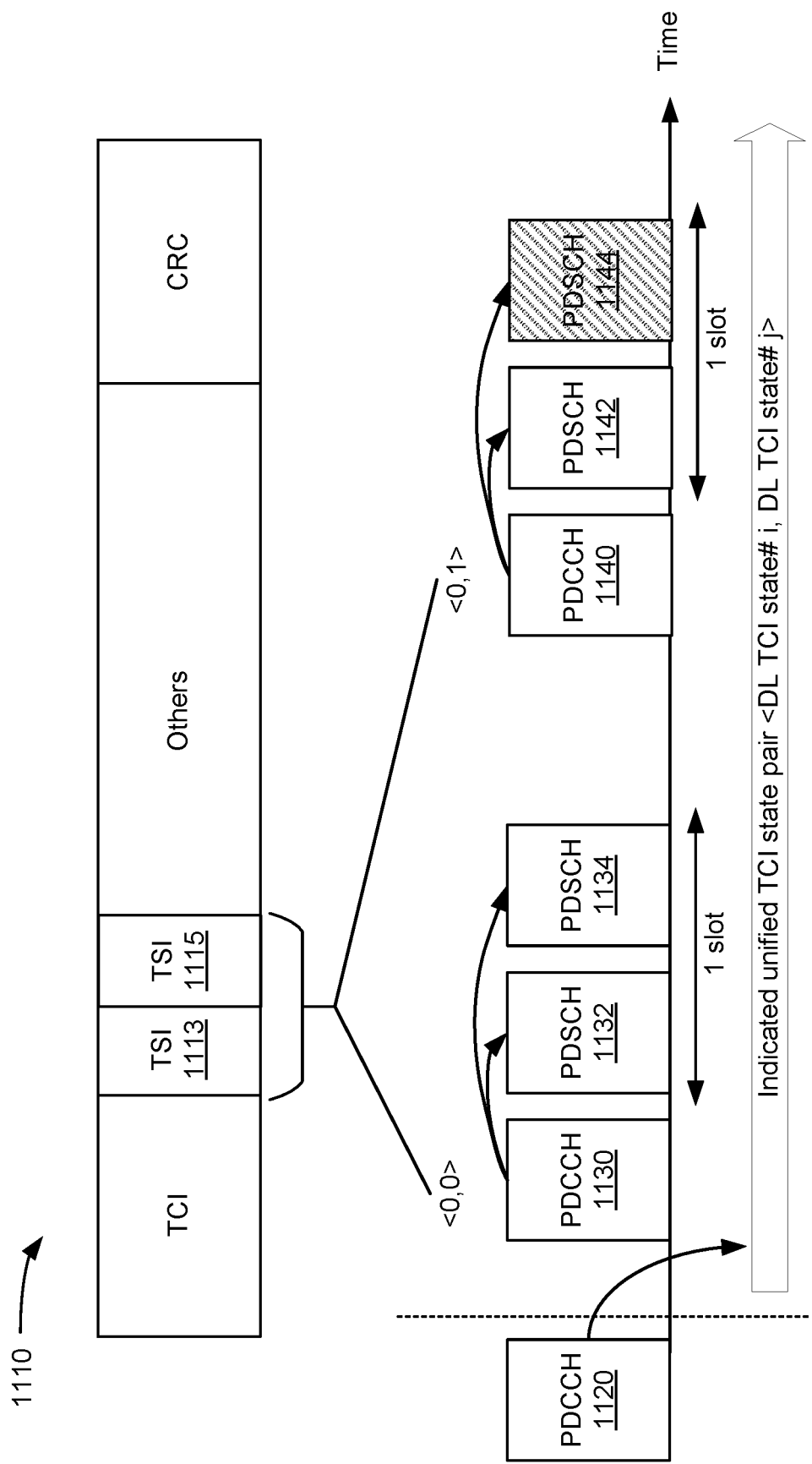
FIG. 11 illustrates a further example of a DCI-based use of unified TCI states, in accordance with some embodiments.

FIG. 11 illustrates a further example of a DCI-based use of unified TCI states, in accordance with some embodiments. A UE can store a table (or some other data structure) that associates mode indices with possible activated TCI state(s) selections, similar to the table described herein above that includes three mode indices (e.g., for two TRPs) or seven mode indices (e.g., for three TRPs). A network can send DCI 1110 to the UE for a PDSCH reception. This DCI 1010 may be an sDCI in a mTRP use case. The DCI 1010 can have a format 1_1 or 1_2 and may be used for scheduling a PDSCH transmission to the UE (or, equivalently, PDSCH reception by the UE). In this case, the DCI format may include a TCI field, others field, and a CRC field. The TCI sate field may be three bit long and its value may indicate a number of unified downlink TCI states that are activated. Although FIG. 11 shows a DCI format used for scheduling, a DCI format that may not schedule PDSCH can also be used and can include a reserved field, similar to the illustration of FIG. 8.

The DCI format can also include two one-bit TCI selection indicator (TSI) fields. The first TSI field 1113 is used for the first PDSCH transmission occasion and the second TSI field 1115 is applied to the second PDSCH transmission occasion. Of course, if more than two TRPs were used, additional TSI field(s) can be added to the DCI format. The value of "0" of the first TSI field 1113 indicates to use the first unified TCI state (e.g., the "unified DL TCI state #i") for the first PDSCH transmission occasion. The value of "1" of the first TSI field 1113 indicates to use the second unified TCI state (e.g., the "unified DL TCI state #j") for the first PDSCH transmission occasion. Likewise, the value of "0" of the second TSI field 1115 indicates to use the first unified TCI state (e.g., the "unified DL TCI state #i") for the second PDSCH transmission occasion. The value of "1" of the second TSI field 1115 indicates to use the second unified TCI state (e.g., the "unified DL TCI state #j") for the second PDSCH transmission occasion.

As further illustrated in FIG. 5, a first PDCCH transmission 1120 occurs and includes first DCI. This first DCI includes a TCI field indicating that the "unified DL TCI state #i" and the "unified DL TCI state #j" are activated.

Thereafter, a second PDCCH transmission 1130 occurs and includes second DCI. This second DCI includes a TCI field and the two TSI fields 11130 and 1115. Each of these two TSI fields 1113 and 1115 is set to "0." As such, the first next PDSCH transmission occasion 1132 scheduled and the second next PDSCH transmission occasion 1134 that are scheduled by the second PDCCH transmission 1130 only use the unified DL TCI state #i."

Later on, a third PDCCH transmission 1140 occurs and includes third DCI. This third DCI includes a TCI field and the two TSI fields 11130 and 1115. The first TSI field 1113 is set to "0," whereas the second TSI field 1115 is set to "1." Each of these two TSI fields 11130 and 1115 is set to "0." As such, the third next PDSCH transmission occasion 1142 scheduled by the third PDCCH transmission 1140 uses the unified DL TCI state #i," whereas the fourth next PDSCH transmission occasion 1144 also scheduled by the third PDCCH transmission 1140 uses the unified DL TCI state #j." For example, a gNB can use the <0,1> value pair for the two TSI fields 11130 and 1115 when the UE approaches the cell boundary without need of changing the activated TCI State pairs.

Figure 12:
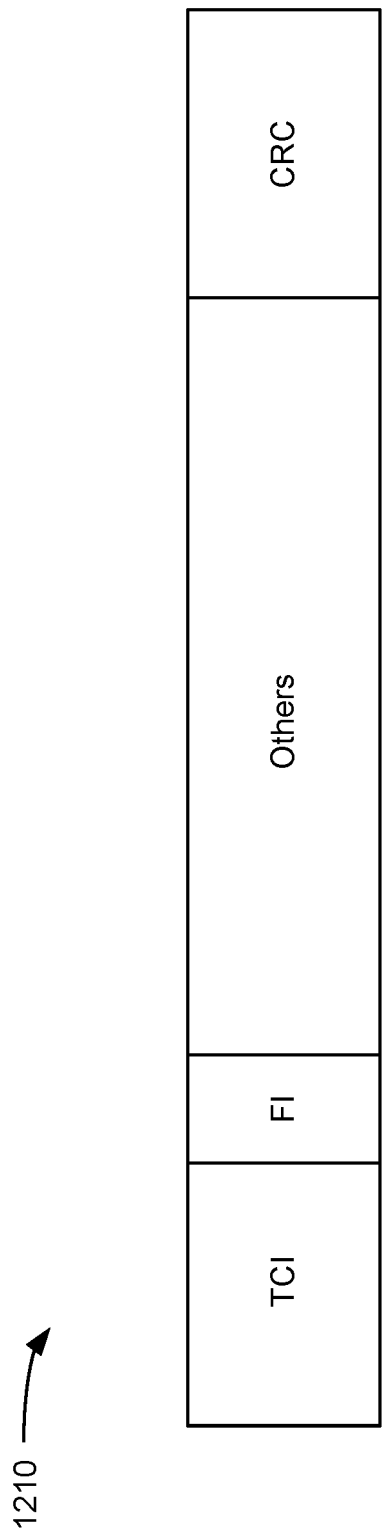
FIG. 12 illustrates an additional example of a DCI-based use of unified TCI states, in accordance with some embodiments.

FIG. 12 illustrates an additional example of a DCI-based use of unified TCI states, in accordance with some embodiments. As explained herein above, a network can send DCI to a UE, where the DCI has a DCI format that includes a TCI field. One function of the TCI field is to indicate a set of unified TCI states that the DCI activates. To reduce the DCI overhead associated with selecting an activated unified TCI state(s), the function of the TCI field can be re-purposed to a second function: the activated unified TCI state(s) selection. As such, depending on which function is enabled, the TCI field can indicate the activated unified TCI state(s) that the DCI activates or the activated unified TCI state(s) selection (assuming that such TCI states have already been activated).

In FIG. 12, the function of the TCI field is indicated explicitly by using a function indicator (FI) field that can be one-bit long. In particular, the UE receives DCI 1210 having a DCI format 1_1 or 1_2 and that includes a TCI field, an FI field, others field, and a CRC field. In the case of no scheduled PDSCH reception, the DCI format can also include a reserved field. If the FI field is set to "0," the UE determines that the TCI field activates a set of unified TCI states, where the value of this field indicates the set. If the FI field is set to "1," the UE determines that the TCI field indicates a selection of a set of activated unified TCI states. Referring back to the first unified TCI state (e.g., the "unified DL TCI state #i") and the second unified TCI state (e.g., the "unified DL TCI state #j"), only tow of the three bits of the TCI field may be used as part of the selection indication. These may be the left utmost bits, for instance. In the case of three TRPs, all three bits of the TCI field can indicate the selection.

Figure 13:
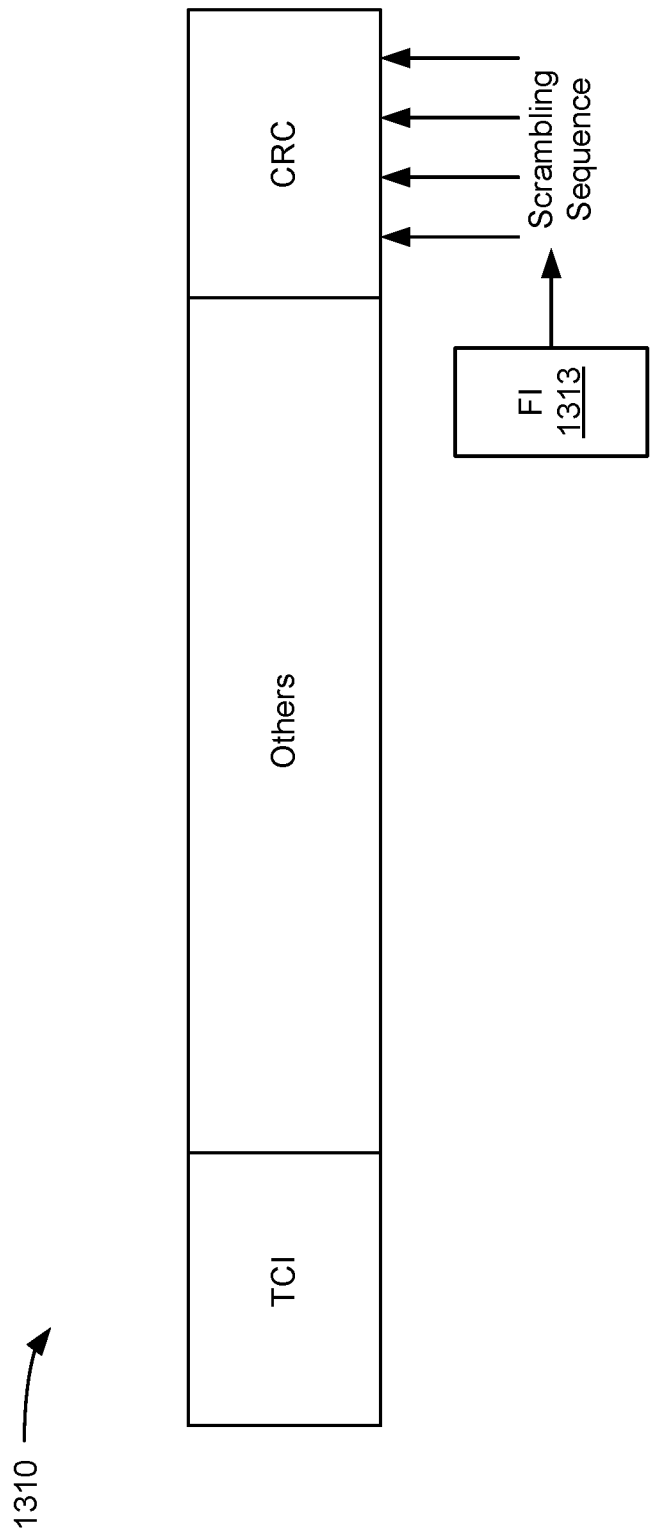
FIG. 13 illustrates another example of a DCI-based use of unified TCI states, in accordance with some embodiments.

FIG. 13 illustrates another example of a DCI-based use of unified TCI states, in accordance with some embodiments. As explained in FIG. 12, a one-bit FI field can be used to indicate one of two functions of the TCI field. Rather than explicitly including this FI field in a DCI format, the bit value maybe carried by selection of a scrambling sequence to scramble the CRC bits of PBCH. One scrambling sequence can be defined for the FI field value of "0" and corresponds to using the TCI field for indicating the unified TCI states that the DCI activates. Another scrambling sequence can be defined for the FI field value of "1" and corresponds to using the TCI field for selecting an activated unified TCI state(s). An example of the two scrambling sequences is shown in the next table.

| FI Field Bit | Scrambling sequence: $[w_0, w_1, w_2, \ldots, w_{23}]$ |
| --- | --- |
| 0 | $[0, 0, 0, \ldots, 0]$ |
| 1 | $[1, 1, 1, \ldots, 1]$ |

As such, the network sends DCI 1310 to the UE. To indicate the first function of the TCI field, the network uses the first scrambling sequence. To indicate the second function of the TCI field, the network uses the second scrambling sequence. Conversely, upon receiving the DCI 1310, the UE descrambles the CRC and determines a descrambling sequence. The UE can perform a look-up to local memory to determine the value of an FI field 1313 that corresponds to the descrambling sequence. If the value indicates "0," the UE determines that the TCI field activates a set of unified TCI states, where the value of this field indicates the set. If the FI field is set to "1," the UE determines that the TCI field indicates a selection of a set of activated unified TCI states.

Figure 14:
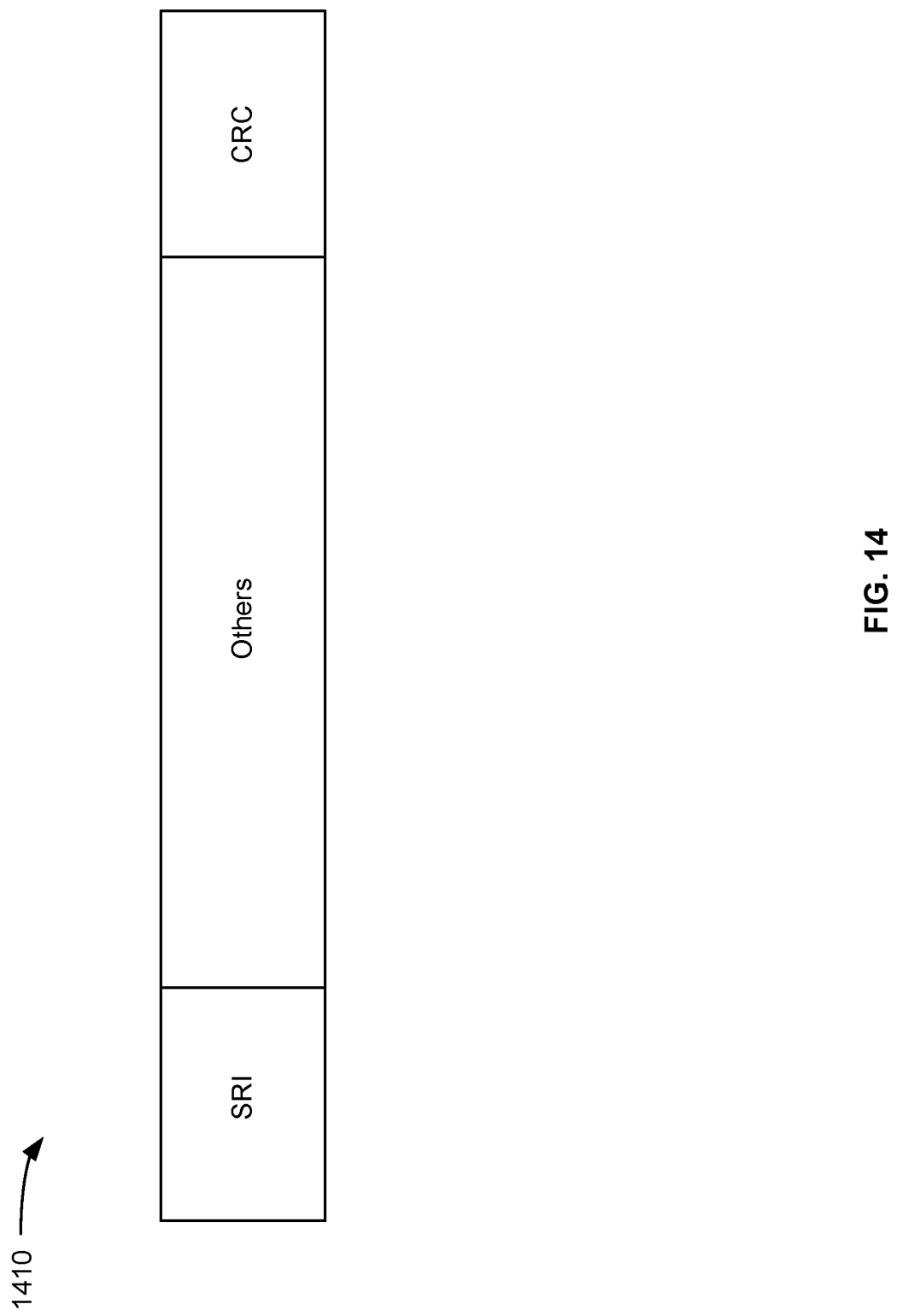
FIG. 14 illustrates yet another example of a DCI-based use of unified TCI states, in accordance with some embodiments.

FIG. 14 illustrates yet another example of a DCI-based use of unified TCI states, in accordance with some embodiments. For a PUSCH transmission, a network can send DCI 1410 to a UE, where this DCI 1410 can have a format (e.g., format 0_1 or 0_2). The format can include a scheduling request indicator (SRI) field, and others field, and a CRC field. The SRI field can be re-purposed to be used as a unified TCI state(s) selection. In particular, the SRI field can be re-interpreted as a mode index (e.g., whereby two of the SRI bits can indicate a value of a mode index in use case of three mode indices). Additionally or alternatively, an ATI field can be added to the DCI format or at least a part of the SRI field can be repurposed to include the ATI field. Additionally or alternatively, multiple TSI fields can be added to the DCI format or at least a part of the SRI field can be repurposed to include such TSI fields.

Referring back to FIGS. 6-14, various embodiments are described in connection with using network-based signaling for a unified TCI state(s) selection for PDSCH and/or PUSCH transmissions. Similar network-based signaling can be used for CSI reporting. In particular, a network can use RRC, MAC CE, and/or DCI to indicate a unified TCI state(s) selection for use by the UE to receive CSI-RS. The UE can then use the indicated unified TCI state(s) to receive the CSI-RS, perform measurements thereon, and generate and send a CSI report back to the network. Such network-based signaling is further described in the next figures.

Figure 15:
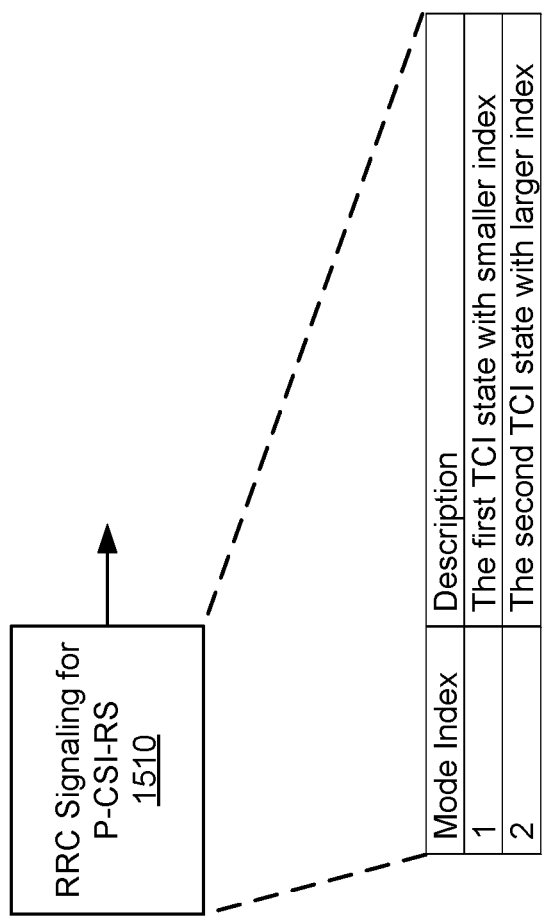
FIG. 15 illustrates another example of RRC-based use of unified TCI states, in accordance with some embodiments.

FIG. 15 illustrates another example of RRC-based use of unified TCI states, in accordance with some embodiments. In particular, RRC signaling 1510 can be used for indicating a unified TCI state(s) selection in association with periodic CSI-RS (P-CSI-RS) resources. Generally, a network configures a P-CSI-RS for a UE by using RRC signaling. If unified TCI state is supported for sDCI mTRP, the TCI state for a P-CSI-RS resource maybe semi-statically configured by the same or different RRC signaling.

The UE can store a table (or use some other data structure) that associates a mode index with an activated unified downlink TCI state selection. The table can be defined based on other RRC signaling or can be predefined based on a technical specification with which the UE complies. In particular, a first mode index (e.g., mode index "1") can correspond to a selection of the first unified TCI state. A second mode index (e.g., mode index "2") can correspond to a selection of the second unified TCI state.

The RRC signaling 1510 can indicate a particular mode index. The UE can then look up the table (or the used data structure) to determine the activated unified downlink TCI state associated with the mode index. If the RRC signaling 1510 indicates mode index "1," the UE applies the first unified downlink TCI state (e.g., the "unified DL TCI state #i") to the P-CSI-RS resource reception. If the RRC signaling 1510 indicates mode index "2," the UE applies the second unified downlink TCI state (e.g., the "unified DL TCI state #j") to the P-CSI-RS resource reception.

For more than two TRPs, the table (or data structure) described herein above can include additional entries that associate additional mode entries with additional activated unified TCI states. For instance, a third unified downlink TCI state (e.g., the "unified DL TCI state #k") may be associated with a third TRP. In this case, the table can associate three mode indices with an individual use of the first unified downlink TCI state, an individual use of the second unified downlink TCI state, and an individual use of the third unified downlink TCI state. The RRC signaling 1510 can use two bits to indicate one of the three mode indices.

Figure 16:
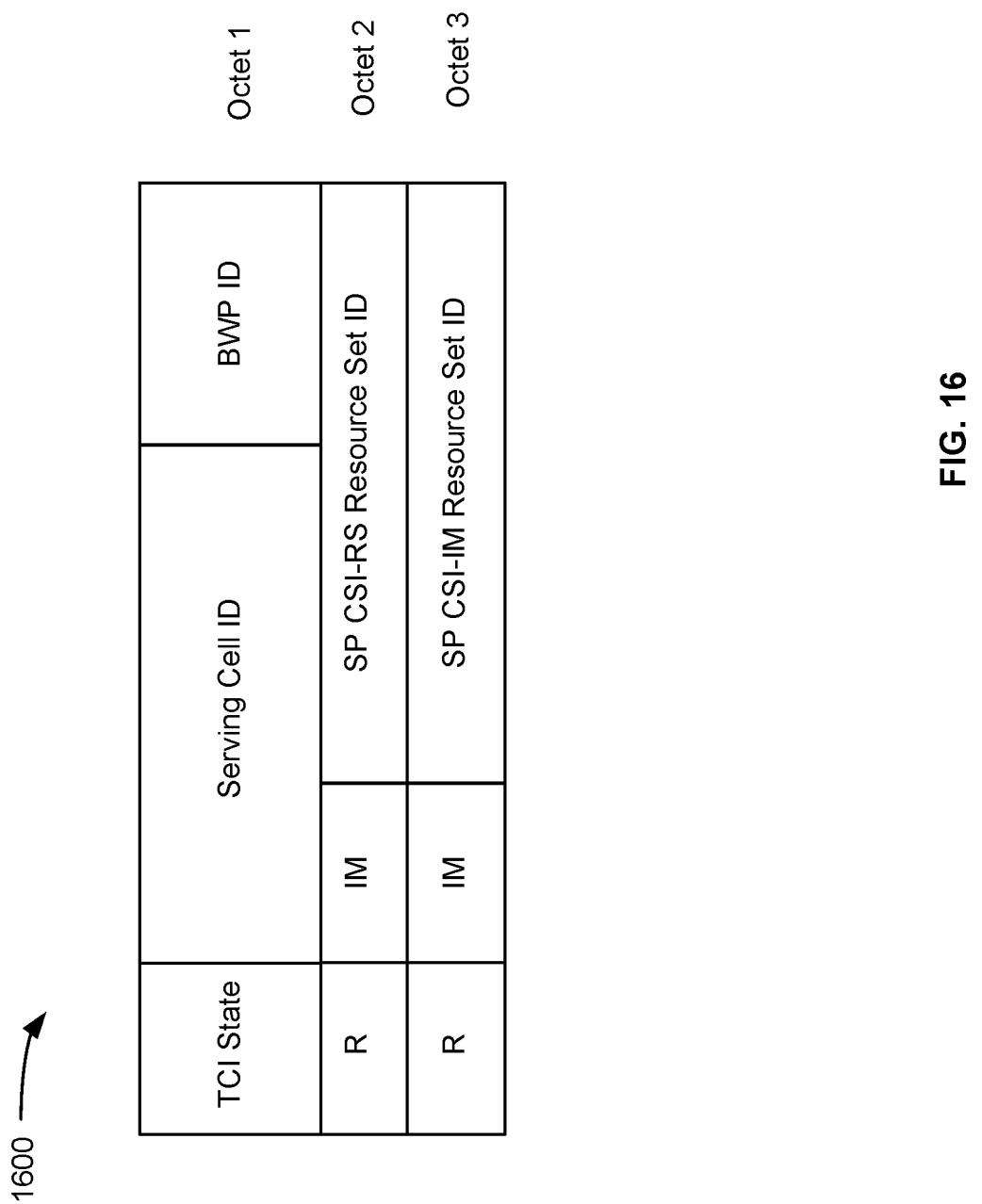
FIG. 16 illustrates another example of MAC CE-based use of unified TCI states, in accordance with some embodiments.

FIG. 16 illustrates another example of MAC CE-based use of unified TCI states, in accordance with some embodiments. AMC CE 1600 can be used to indicate a selection of a unified TCI state from the activated unified TCI States for each CSI-RS resource set. Each CSI-RS resource set can include one or more semipersistent CSI-RS (SP-CSI-RS) resources.

The UE can store a table (or use some other data structure) that associates a mode index with an activated unified downlink TCI state selection. The table can be defined based on other RRC signaling or can be predefined based on a technical specification with which the UE complies. In particular, a first mode index (e.g., mode index "1") can correspond to a selection of the first unified TCI state. A second mode index (e.g., mode index "2") can correspond to a selection of the second unified TCI state.

The MAC CE 1600 can indicate a particular mode index. The UE can then look up the table (or the used data structure) to determine the activated unified downlink TCI state associated with the mode index. If the MAC CE 1600 indicates mode index "1," the UE applies the first unified TCI state to the CSI-RS resource set. If the MAC CE 1600 indicates mode index "2," the UE applies the second unified TCI state to the CSI-RS resource set.

The MAC CE 1600 can be identified by a MAC subheader with a logical channel identifier (LCID) indicating that the MAC CE 1600 is for an activated TCI state selection. As illustrated in FIG. 16, the MAC CE 1600 can have a fixed size (e.g., three one octets) and includes a plurality of fields. A first field can be a serving cell identifier field that indicates the identity of the serving cell for which the MAC CE 1600 applies. A second field can be a bandwidth part indicator. This field indicates a downlink bandwidth part for which the MAC CE 1600 applies. This field may be needed for mDCI in mTRP case only. It can be reserved for sDCI in an mTRP case. A third field can be a SP CSI-RS resource set identifier field. This field contains an index of non-zero power (NZP) CSI-RS resource set containing semi persistent NZP CSI-RS resources to associate with the selected TCI State. A fourth field can be an SP-CSI for interference measurement (IM) resource set identifier field. This field contains an index of a CSI-IM resource set containing semi persistent CSI-IM resources to use the same selected TCI State. A fifth field can be an IM field indicating the presence of the octet containing SP CSI-IM resource set ID field. Two Reserved "R" fields can also be included. In addition, the MAC CE 1700 can include a TCI state field. In the case of two mode indices, this TCI state field can be on-bit long. A value "0" indicates to select the first unified TCI State. In comparison, a value "1" indicates to select the second unified TCI State. Of course, if more than two mode indices are used (e.g., in the case of a third TRP), the TCI state field can include a larger number of bits.

Figure 17:
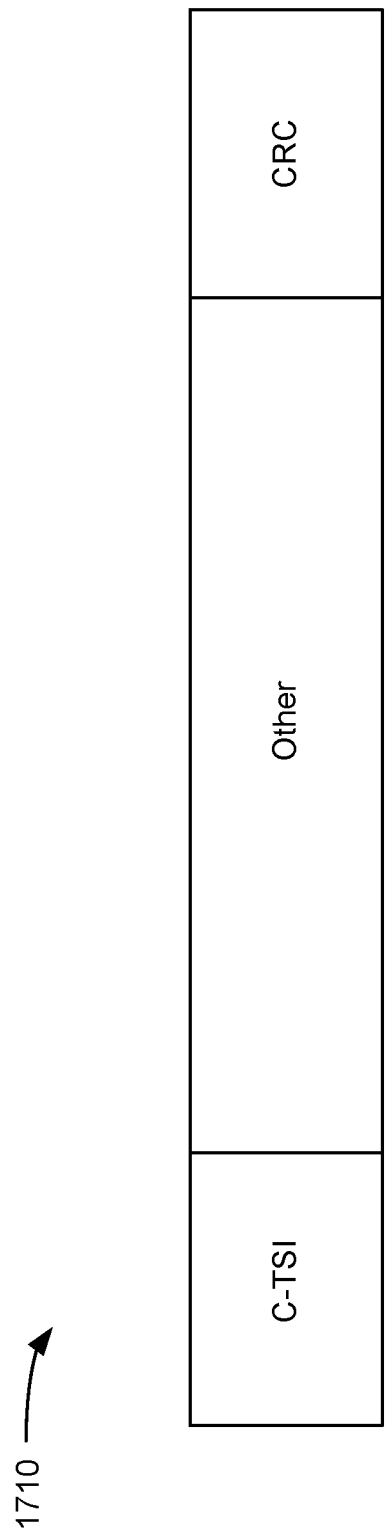
FIG. 17 illustrates another example of DCI-based use of unified TCI states, in accordance with some embodiments.

FIG. 17 illustrates another example of DCI-based use of unified TCI states, in accordance with some embodiments. The example relates to aperiodic CI-RS. It may be possible to use RRC signaling, whereby a network indicates to a UE, for each CSI-RS resource in an aperiodic CSI-RS resource set or for each aperiodic CSI-RS resource set, a selection of one of unified downlink TCI states. Additionally or alternatively, the network can send DCI 1710 to the UE, where the DCI 1710 indicates a unified TCI state selection to use in connection with an aperiodic CSI-RS resource set or with an aperiodic CSI-RS resource in an aperiodic CSI-RS resource set.

As illustrated in FIG. 17, the TCI State of aperiodic CSI-RS resource maybe determined based on the triggering DCI 1710. The DCI 1710 can have a format that includes a CSI-RS TCI State Indicator (C-TSI) field. This field can indicate the unified TCI state for an aperiodic CSI-RS resource set.

Referring back to two TRPs and two unified downlink TCI states, the (C-TSI) field can be one-bit long to indicate the selection of the first activated unified downlink TCI state or the second activated unified downlink TCI state. Of course, if more than two TRPs are used, the C-TSI field can be longer.

In another example and referring back to two TRPs and two unified downlink TCI states, the (C-TSI) field can be two-bit long. When the C-TSI field is set to "00," the first activated unified downlink TCI state is selected. When the C-TSI field is set to "01," the second activated unified downlink TCI state is selected. When the C-TSI field is set to "10" or "1," both the first and second activated unified downlink TCI states are selected. A "10" value can be used as a codepoint to indicate a cycling mapping selection, whereas a "11" value can be used as another codepoint to indicate a sequential mapping selection.

The cycling mapping for two unified TCI states can correspond to a first mode. In this mode, the first and second TCI states are applied to the first and second aperiodic CSI-RS resource sets, respectively, and the same TCI mapping pattern continues to the remaining aperiodic CSI-RS resource sets.

The sequential mapping for two unified TCI states can correspond to a second mode. In this mode, the first TCI state is applied to a first plurality of aperiodic CSI-RS resource sets that are associated with the CSI report, and the second TCI state is applied to the remaining second plurality of aperiodic CSI-RS resource sets that are associated with the CSI report. For instance, the first plurality of CSI-RS resource sets corresponds to [M/2], whereas the second plurality of CSI-RS resource sets corresponds to [M/2], where M represents the total number of aperiodic CSI-RS resource sets triggered by the DCI 1710.

FIG. 18 illustrates an example of an operational flow/algorithmic structure 1800 implemented by a UE for using unified TCI states, in accordance with some embodiments. The UE is an example of the UEs described herein above. Components thereof, such as one or more processors configured with program code, can execute the operational flow/algorithmic structure 1800.

In an example, the operational flow/algorithmic structure 1800 includes at, 1802, receiving information indicating that a first transmission configuration indicator (TCI) state associated with a first transmission and reception point (TRP) is activated and that a second TCI state associated with a second TRP is activated, wherein each one of the first TCI state and the second TCI state is applicable to a plurality of channels. For instance, the information can be received from a network via RRC signaling, MAC CE, or DCI. Each of the first and second TCI states can be a unified TCI state. For downlink, a unified TCI state can be a unified downlink TCI state. For uplink a unified TCI state can be a unified uplink TCI state.

In an example, the operational flow/algorithmic structure 1800 includes at, 1804, determining an activated TCI state to use in association with a communication on a channel of the plurality of channels by at least selecting the activated TCI state from the first TCI state and the second TCI state, wherein the communication includes a physical downlink shared channel (PDSCH) transmission to the UE or a physical uplink shared channel (PUSCH) transmission from the UE. The activated TCI state is an activated unified TCI state. For instance, the UE uses a predefined set of rules to determine an activated unified TCI state(s) selection, where the selection can be one or both of the first unified TCI state and/or the second TCI state. In the case of PDSCH transmission only, a unified TCI state can be a unified downlink TCI state. In the case of PUSCH transmission only, a unified TCI state can be a unified uplink TCI state. In the case of both of PDSCH transmission and PUSCH transmission, a unified TCI state can be a pair of a unified downlink TCI state and a unified uplink TCI state. In another illustration, additional RRC signaling, MA CE, and/or DCI is received from the network to indicate the activated unified TCI state(s) selection.

In an example, the operational flow/algorithmic structure 1800 includes at, 1806, performing the communication based on the activated TCI state. For instance, the activated TCI state is applied to a PDSCH transmission occasion and/or a PUSCH transmission occasion.

FIG. 19 illustrates an example of an operational flow/algorithmic structure 1900 implemented by a network for using unified TCI states, in accordance with some embodiments. The network is an example of the networks described herein above. Components thereof, such as a base station or a network node, can execute the operational flow/algorithmic structure 1900.

In an example, the operational flow/algorithmic structure 1900 includes at, 1902, sending, to a user equipment (UE), first information indicating that a first transmission configuration indicator (TCI) state associated with a first transmission and reception point (TRP) is activated and that a second TCI state associated with a second TRP is activated, wherein each one of the first TCI state and the second TCI state is applicable to a plurality of channels. For instance, the first information can be sent via RRC signaling, MAC CE, or DCI. Each of the first and second TCI states can be a unified TCI state. For downlink, a unified TCI state can be a unified downlink TCI state. For uplink a unified TCI state can be a unified uplink TCI state.

In an example, the operational flow/algorithmic structure 1900 includes at, 1904, sending, to the UE, second information indicating that an activated TCI state is to be used in association with a communication on a channel of the plurality of channels by at least selecting, wherein the second information causes the UE to select the activated TCI state from the first TCI state and the second TCI state, wherein the communication includes a physical downlink shared channel (PDSCH) transmission to the UE or a physical uplink shared channel (PUSCH) transmission from the UE. The activated TCI state is an activated unified TCI state. For instance, the second information is sent as additional RRC signaling, MA CE, and/or DCI to indicate the activated unified TCI state(s) selection. In the case of PDSCH transmission only, a unified TCI state can be a unified downlink TCI state. In the case of PUSCH transmission only, a unified TCI state can be a unified uplink TCI state. In the case of both of PDSCH transmission and PUSCH transmission, a unified TCI state can be a pair of a unified downlink TCI state and a unified uplink TCI state. In another illustration, In an example, the operational flow/algorithmic structure 1900 includes at, 1906, performing the communication based on the activated TCI state. For instance, the activated TCI state is applied to a scheduled PDSCH transmission and/or a scheduled PUSCH transmission.

FIG. 20 illustrates another example of an operational flow/algorithmic structure 2000 implemented by a UE for using unified TCI states, in accordance with some embodiments. The UE is an example of the UEs described herein above. Components thereof, such as one or more processors configured with program code, can execute the operational flow/algorithmic structure 2000.

In an example, the operational flow/algorithmic structure 2000 includes at, 2002, receiving information indicating that a first transmission configuration indicator (TCI) state associated with a first transmission and reception point (TRP) is activated and that a second TCI state associated with a second TRP is activated, wherein each one of the first TCI state and the second TCI state is applicable to a plurality of channels. For instance, the information can be received from a network via RRC signaling, MAC CE, or DCI. Each of the first and second TCI states can be a unified TCI state. For downlink, a unified TCI state can be a unified downlink TCI state. For uplink a unified TCI state can be a unified uplink TCI state.

In an example, the operational flow/algorithmic structure 2000 includes at, 2004, determining an activated TCI state to use in association with receiving a channel state information reference signal (CSI-RS) resource to generate a channel state information (CSI) report, wherein the activated TCI state corresponds to at least one of the first TCI state or the second TCI state. The activated TCI state is an activated unified TCI state. For instance, the UE uses a predefined set of rules to determine an activated unified TCI state(s) selection, where the selection can be one or both of the first unified TCI state and/or the second TCI state. Based on the set of rules, the UE can select one or both of the first activated unified downlink TCI state and/or the second activated unified downlink TCI state for a CSI-RS resource or a CSI-RS resource set to receive and measure. In another illustration, RRC signaling can be received from the network for periodic CSI-RS resources. The RRC signaling can indicate the selection of one of the first activated unified TCI state or the second activated unified TCI state per P-CSI-RS resource. In yet another illustration, a MAC CE can be received from the network for an SP-CSI resource set. The MAC CE can indicate the selection of one of the first activated unified TCI state or the second activated unified TCI state for the SP-CSI-RS resource set. In a further illustration, RRC signaling can be received to configure aperiodic (AP) CSI-RS resources. The RRC signaling can also indicate the selection of one of the first activated unified TCI state or the second activated unified TCI state for each AP-CSI-RS resource or each AP-CSI-RS resource set. In an additional example, DCI can be received to trigger aperiodic CSI reporting, the DCI can also indicate the selection of one of the first activated unified TCI state or the second activated unified TCI state for an AP-CSI-RS resource set.

In an example, the operational flow/algorithmic structure 2000 includes at, 2006, generating the CSI report based on reception of the CSI-RS resource using the activated TCI state. For instance, the UE uses the activated unified downlink TCI state(s) to receive and measure a CSI-RS resource, as applicable, and then generate and send the CSI report to the network.

FIG. 21 illustrates another example of an operational flow/algorithmic structure 2100 implemented by a network for using unified TCI states, in accordance with some embodiments. The network is an example of the networks described herein above. Components thereof, such as a base station or a network node, can execute the operational flow/algorithmic structure 2100.

In an example, the operational flow/algorithmic structure 2100 includes at, 2102, sending, to a user equipment (UE), first information indicating that a first transmission configuration indicator (TCI) state associated with a first transmission and reception point (TRP) is activated and that a second TCI state associated with a second TRP is activated, wherein each one of the first TCI state and the second TCI state is applicable to a plurality of channels. For instance, the first information can be sent via RRC signaling, MAC CE, or DCI. Each of the first and second TCI states can be a unified TCI state. For downlink, a unified TCI state can be a unified downlink TCI state. For uplink a unified TCI state can be a unified uplink TCI state.

In an example, the operational flow/algorithmic structure 2100 includes at, 2104, sending, to the UE, second information indicating an activated TCI state to use in association with receiving a channel state information reference signal (CSI-RS) resource for a channel state information (CSI) report, wherein the activated TCI state corresponds to at least one of the first TCI state or the second TCI state. For instance, RRC signaling can be sent for periodic CSI-RS resources. The RRC signaling can indicate the selection of one of the first activated unified TCI state or the second activated unified TCI state per P-CSI-RS resource. In another illustration, a MAC CE can be sent for an SP-CSI resource set. The MAC CE can indicate the selection of one of the first activated unified TCI state or the second activated unified TCI state for the SP-CSI-RS resource set. In yet another illustration, RRC signaling can be sent to configure aperiodic (AP) CSI-RS resources. The RRC signaling can also indicate the selection of one of the first activated unified TCI state or the second activated unified TCI state for each AP-CSI-RS resource or each AP-CSI-RS resource set. In a further example, DCI can be sent to trigger aperiodic CSI reporting, the DCI can also indicate the selection of one of the first activated unified TCI state or the second activated unified TCI state for an AP-CSI-RS resource set.

In an example, the operational flow/algorithmic structure 2100 includes at, 2106 receiving, from the UE, the CSI report based on the activated TCI state. For instance, the network sends the CSI-RS resource. The UE then uses the activated unified downlink TCI state(s) to receive and measure the CSI-RS resource, as applicable, and generate the CSI report. The network can then receive the CSI report.

Figure 22:
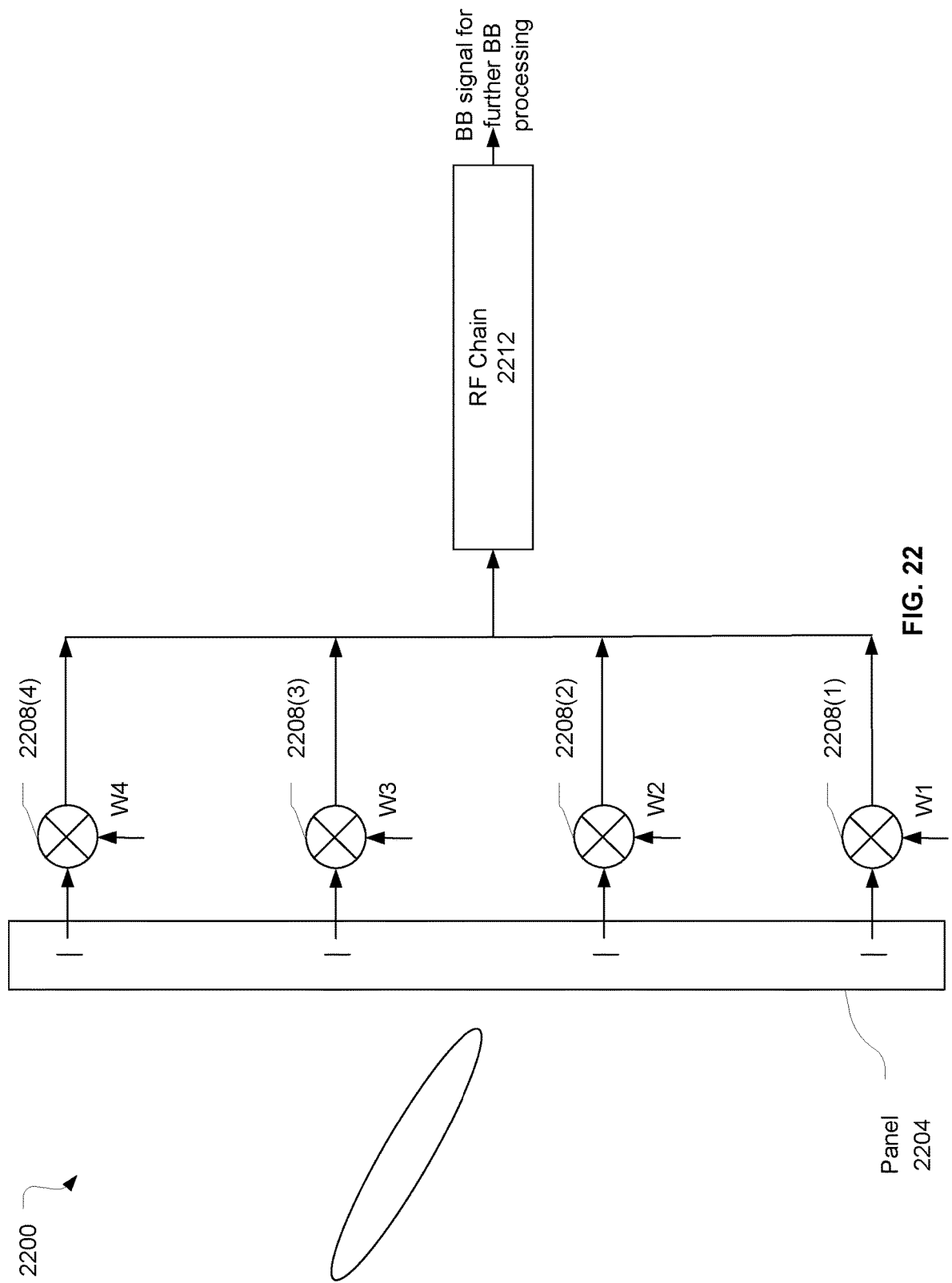
FIG. 22 illustrates an example of receive components, in accordance with some embodiments.

FIG. 22 illustrates receive components 2200 of the UE 104, in accordance with some embodiments. The receive components 2200 may include an antenna panel 2204 that includes a number of antenna elements. The panel 2204 is shown with four antenna elements, but other embodiments may include other numbers.

The antenna panel 2204 may be coupled to analog beamforming (BF) components that include a number of phase shifters 2208(1)-2208(4). The phase shifters 2208(1)-2208(4) may be coupled with a radio-frequency (RF) chain 2212. The RF chain 2212 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 2208(1)-2208(4) to provide a receive beam at the antenna panel 2204. These BF weights may be determined based on the channel-based beamforming.

Figure 23:
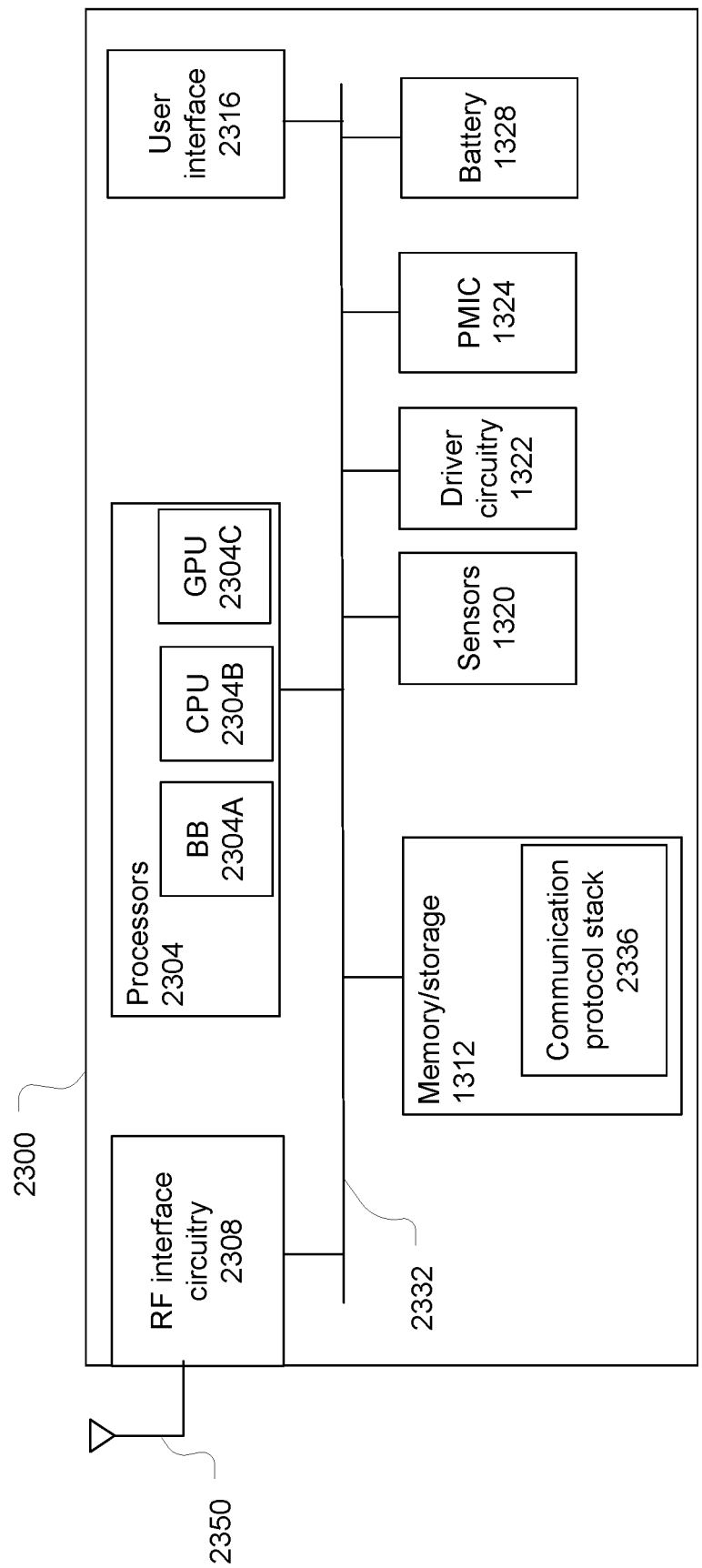
FIG. 23 illustrates an example of a UE, in accordance with some embodiments.

FIG. 23 illustrates a UE 2300, in accordance with some embodiments. The UE 2300 may be similar to and substantially interchangeable with UE 104 of FIG. 1.

Similar to that described above with respect to UE 204, the UE 2300 may be any mobile or non-mobile computing device, such as mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 2300 may include processors 2304, RF interface circuitry 2308, memory/storage 2312, user interface 2316, sensors 2320, driver circuitry 2322, power management integrated circuit (PMIC) 2324, and battery 2328. The components of the UE 2300 may be implemented as integrated circuits (ICs), portions thereof, discrete electronic devices, or other modules, logic, hardware, software, firmware, or a combination thereof. The block diagram of FIG. 23 is intended to show a high-level view of some of the components of the UE 2300. However, some of the components shown may be omitted, additional components may be present, and different arrangements of the components shown may occur in other implementations.

The components of the UE 2300 may be coupled with various other components over one or more interconnects 2332, which may represent any type of interface, input/output, bus (local, system, or expansion), transmission line, trace, optical connection, etc., that allows various circuit components (on common or different chips or chipsets) to interact with one another.

The processors 2304 may include processor circuitry, such as baseband processor circuitry (BB) 2304A, central processor unit circuitry (CPU) 2304B, and graphics processor unit circuitry (GPU) 2304C. The processors 2304 may include any type of circuitry or processor circuitry that executes or otherwise operates computer-executable instructions, such as program code, software modules, or functional processes from memory/storage 2312 to cause the UE 2300 to perform operations as described herein.

In some embodiments, the baseband processor circuitry 2304A may access a communication protocol stack 2336 in the memory/storage 2312 to communicate over a 3GPP compatible network. In general, the baseband processor circuitry 2304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 2308.

The baseband processor circuitry 2304A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 2304A may also access group information from memory/storage 2312 to determine search space groups in which a number of repetitions of a PDCCH may be transmitted.

The memory/storage 2312 may include any type of volatile or non-volatile memory that may be distributed throughout the UE 2300. In some embodiments, some of the memory/storage 2312 may be located on the processors 2304 themselves (for example, L1 and L2 cache), while other memory/storage 2312 is external to the processors 2304 but accessible thereto via a memory interface. The memory/storage 2312 may include any suitable volatile or non-volatile memory, such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 2308 may include transceiver circuitry and a radio frequency front module (RFEM) that allows the UE 2300 to communicate with other devices over a radio access network. The RF interface circuitry 2308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 2350 and proceed to filter and amplify (with a low-noise amplifier) the signal. The signal may be provided to a receiver of the transceiver that down-converts the RF signal into a baseband signal that is provided to the baseband processor of the processors 2304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 2350.

In various embodiments, the RF interface circuitry 2308 may be configured to transmit/receive signals in a manner compatible with NR access technologies.

The antenna 2350 may include a number of antenna elements that each convert electrical signals into radio waves to travel through the air and to convert received radio waves into electrical signals. The antenna elements may be arranged into one or more antenna panels. The antenna 2350 may have antenna panels that are omnidirectional, directional, or a combination thereof to enable beamforming and multiple input, multiple output communications. The antenna 2350 may include microstrip antennas, printed antennas fabricated on the surface of one or more printed circuit boards, patch antennas, phased array antennas, etc. The antenna 2350 may have one or more panels designed for specific frequency bands including bands in FR1 or FR2.

The user interface circuitry 2316 includes various input/output (I/O) devices designed to enable user interaction with the UE 2300. The user interface 2316 includes input device circuitry and output device circuitry. Input device circuitry includes any physical or virtual means for accepting an input, including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes (LEDs) and multi-character visual outputs), or more complex outputs, such as display devices or touchscreens (for example, liquid crystal displays (LCDs), LED displays, quantum dot displays, projectors, etc.), with the output of characters, graphics, multimedia objects, and the like being generated or produced from the operation of the UE 2300.

The sensors 2320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 2322 may include software and hardware elements that operate to control particular devices that are embedded in the UE 2300, attached to the UE 2300, or otherwise communicatively coupled with the UE 2300. The driver circuitry 2322 may include individual drivers allowing other components to interact with or control various input/output (I/O) devices that may be present within, or connected to, the UE 2300. For example, driver circuitry 2322 may include a display driver to control and allow access to a display device, a touchscreen driver to control and allow access to a touchscreen interface, sensor drivers to obtain sensor readings of sensor circuitry 2320 and control and allow access to sensor circuitry 2320, drivers to obtain actuator positions of electro-mechanic components or control and allow access to the electro-mechanic components, a camera driver to control and allow access to an embedded image capture device, audio drivers to control and allow access to one or more audio devices.

The PMIC 2324 may manage power provided to various components of the UE 2300. In particular, with respect to the processors 2304, the PMIC 2324 may control power-source selection, voltage scaling, battery charging, or DC-to-DC conversion.

In some embodiments, the PMIC 2324 may control, or otherwise be part of, various power saving mechanisms of the UE 2300. For example, if the platform UE is in an RRC Connected state, where it is still connected to the RAN node as it expects to receive traffic shortly, then it may enter a state known as Discontinuous Reception Mode (DRX) after a period of inactivity. During this state, the UE 2300 may power down for brief intervals of time and thus save power. If there is no data traffic activity for an extended period of time, then the UE 2300 may transition off to an RRC Idle state, where it disconnects from the network and does not perform operations, such as channel quality feedback, handover, etc. The UE 2300 goes into a very low power state and it performs paging where again it periodically wakes up to listen to the network and then powers down again. The UE 2300 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 2328 may power the UE 2300, although in some examples the UE 2300 may be mounted deployed in a fixed location and may have a power supply coupled to an electrical grid. The battery 2328 may be a lithium-ion battery, a metal-air battery, such as a zinc-air battery, an aluminum-air battery, a lithium-air battery, and the like. In some implementations, such as in vehicle-based applications, the battery 2328 may be a typical lead-acid automotive battery.

Figure 24:
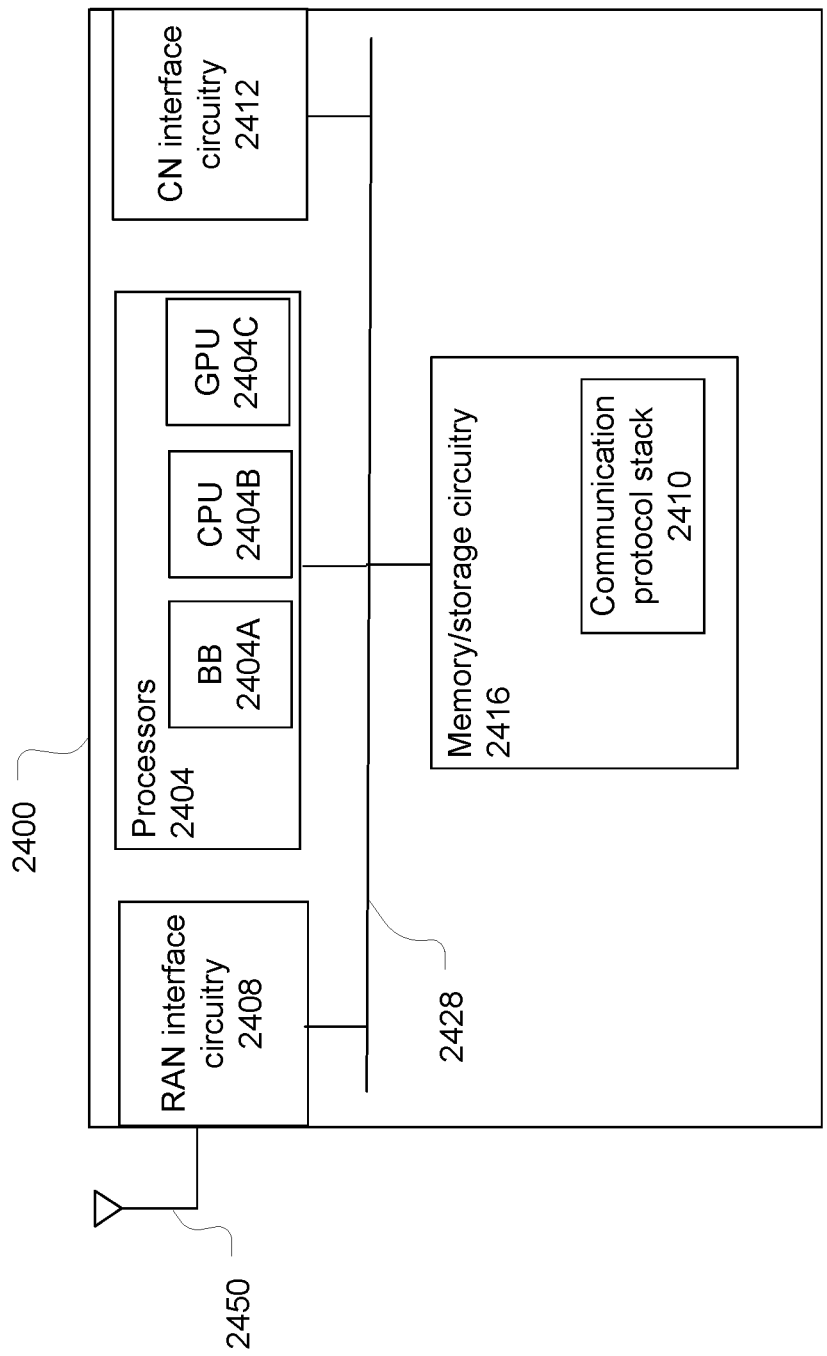
FIG. 24 illustrates an example of a base station, in accordance with some embodiments.

FIG. 24 illustrates a gNB 2400, in accordance with some embodiments. The gNB 2400 may be similar to and substantially interchangeable with the gNB 108 of FIG. 1.

The gNB 2400 may include processors 2404, RAN interface circuitry 2408, core network (CN) interface circuitry 2412, and memory/storage circuitry 2416. A TRP may include similar components.

The components of the gNB 2400 may be coupled with various other components over one or more interconnects 2428.

The processors 2404, RAN interface circuitry 2408, memory/storage circuitry 2416 (including communication protocol stack 2410), antenna 2450, and interconnects 2428 may be similar to like-named elements shown and described with respect to FIG. 23.

The CN interface circuitry 2412 may provide connectivity to a core network, for example, a Fifth Generation Core network (5GC) using a 5GC-compatible network interface protocol, such as carrier Ethernet protocols, or some other suitable protocol. Network connectivity may be provided to/from the gNB 2400 via a fiber optic or wireless backhaul. The CN interface circuitry 2412 may include one or more dedicated processors or FPGAs to communicate using one or more of the aforementioned protocols. In some implementations, the CN interface circuitry 2412 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method implemented by a user equipment (UE), the method comprising: receiving information indicating that a first transmission configuration indicator (TCI) state associated with a first transmission and reception point (TRP) is activated and that a second TCI state associated with a second TRP is activated, wherein each one of the first TCI state and the second TCI state is applicable to a plurality of channels; determining an activated TCI state to use in association with a communication on a channel of the plurality of channels by at least selecting the activated TCI state from the first TCI state and the second TCI state, wherein the communication includes a physical downlink shared channel (PDSCH) transmission to the UE or a physical uplink shared channel (PUSCH) transmission from the UE; and performing the communication based on the activated TCI state.

Example 2 includes a method implemented by a network, the method comprising: sending, to a user equipment (UE), first information indicating that a first transmission configuration indicator (TCI) state associated with a first transmission and reception point (TRP) is activated and that a second TCI state associated with a second TRP is activated, wherein each one of the first TCI state and the second TCI state is applicable to a plurality of channels; sending, to the UE, second information indicating that an activated TCI state is to be used in association with a communication on a channel of the plurality of channels by at least selecting, wherein the second information causes the UE to select the activated TCI state from the first TCI state and the second TCI state, wherein the communication includes a physical downlink shared channel (PDSCH) transmission to the UE or a physical uplink shared channel (PUSCH) transmission from the UE; and performing the communication based on the activated TCI state.

Example 3 includes the method of example 1 or 2, wherein the method further comprises: determining, based on a predefined set of rules, that the first TCI state is to be used for a first transmission occasion and that the second TCI state is to be used for a second transmission occasion, wherein each one of the first transmission occasion and the second transmission occasion being a corresponding PDSCH transmission occasion or a corresponding PUSCH transmission.

Example 4 includes the method of example 3, wherein the first transmission occasion and the second transmission occasion use an fdmScheme B, tdmScheme A, tdmScheme B, or a spatial division multiplexing (SDM) scheme.

Example 5 includes the method of example 1 or 2, wherein the method further comprises: determining, based on a predefined set of rules, that the first TCI state is used for a first frequency domain resource allocation of a PDSCH transmission and that the second TCI state is used for a second frequency domain resource allocation of the PDSCH transmission occasion.

Example 6 includes the method of example 1 or 2, wherein the method further comprises: receiving or sending radio resource control (RRC) information indicating a selection of the activated TCI state from the first TCI state and the second TCI state.

Example 7 includes the method of example 6, wherein the RRC information indicates a mode index from a plurality of mode indices, wherein a first mode index corresponds to selecting the first TCI state, a second mode index corresponds to selecting the second TCI state, and a third mode index corresponds to selecting the first TCI state and the second TCI state.

Example 8 includes the method of example 1 or 2, wherein the method further comprises: receiving or sending a media access control (MAC) control element (CE) indicating a selection of the activated TCI state from the first TCI state and the second TCI state, wherein the MAC CE includes a logical channel identifier (LCD) associated with a TCI state selection.

Example 9 includes the method of example 8, wherein the MAC CE indicates a mode index selected from a plurality of mode indices, wherein a first mode index corresponds to selecting the first TCI state, a second mode index corresponds to selecting the second TCI state, and a third mode index corresponds to selecting the first TCI state and the second TCI state.

Example 10 includes the method of example 9, wherein MAC CE includes a coreset pool identifier indicating that the selected mode index is associated with channels that are configured with a corresponding coreset pool index identifier.

Example 11 includes the method of example 1 or 2, wherein the method further comprises: receiving or sending downlink control information (DCI) indicating a selection of the activated TCI state from the first TCI state and the second TCI state, wherein the selection corresponds to selecting the first TCI state only, selecting the second TCI state only, or selecting the first TCI state and the second TCI state.

Example 12 includes the method of example 11, wherein the DCI has a DCI format without a downlink assignment, wherein the DCI format includes a TCI field and a reserved field, wherein a number of bits of the reserved field are re-purposed to indicate the selection.

Example 13 includes the method of example 11, wherein the DCI has a DCI format with a downlink assignment, wherein the DCI format includes a TCI field and an additional filed with additional bits outside of the TCI field, wherein the additional field indicates the selection.

Example 14 includes the method of example 11, wherein the first TCI state is selected by default for a channel, and wherein the DCI indicates whether the second TCI state is to be selected too or not for the channel.

Example 15 includes the method of example 14, wherein the first TCI state is also used for a physical downlink control channel (PDCCH) transmission to the UE.

Example 16 includes the method of example 1 or 2, wherein the method further comprises: receiving or sending downlink control information (DCI) indicating a selection of the activated TCI state from the first TCI state and the second TCI state, wherein the selection corresponds to selecting the first TCI state only, selecting the second TCI state only, or selecting both the first TCI state and the second TCI state, and wherein the DCI has a DCI format that includes a TCI field, a first TCI selection indicator (TSI) field indicating whether the first TCI state is to be selected, and a second TSI field Indicating whether the second TCI state is to be selected.

Example 17 includes the method of example 1 or 2, wherein the method further comprises: receiving or sending downlink control information (DCI) indicating a selection of the activated TCI state from the first TCI state and the second TCI state, wherein the selection corresponds to selecting the first TCI state only, selecting the second TCI state only, or selecting both the first TCI state and the second TCI state, and wherein the DCI has a DCI format that includes a TCI field and a function indicator (FI) field indicating whether a function of the TCI field in the DCI is to indicate the selection of the activated TCI state.

Example 18 includes the method of example 1 or 2, wherein the method further comprises: receiving or sending downlink control information (DCI) indicating a selection of the activated TCI state from the first TCI state and the second TCI state, wherein the selection corresponds to selecting the first TCI state only, selecting the second TCI state only, or selecting both the first TCI state and the second TCI state, and wherein the DCI has a DCI format that includes a TCI field and cyclic redundant check (CRC) bits; determining that the CRC bits are associated with a scrambling sequence; and determining that the scrambling sequence is associated with a function bit indicating whether a function of the TCI field is to indicate the selection of the activated TCI state.

Example 19 includes the method of example 1 or 2, wherein the communication includes the PUSCH transmission, and wherein the method further comprises: receiving or sending downlink control information (DCI) indicating a selection of the activated TCI state from the first TCI state and the second TCI state, wherein the selection corresponds to selecting the first TCI state only, selecting the second TCI state only, or selecting the first TCI state and the second TCI state, wherein the DCI has a DCI format that includes a sounding reference signal (SRS) resource indicator (SRI) field and cyclic redundant check (CRC) bits, wherein the SRI field indicates the selection.

Example 20 includes the method of example 1 or 2, wherein the communication includes the PUSCH transmission, wherein the first TCI state is selected by default, and wherein the method further comprises: receiving or sending downlink control information (DCI) indicating a selection of the activated TCI state from the first TCI state and the second TCI state, wherein the selection corresponds to selecting the first TCI state only, selecting the second TCI state only, or selecting both the first TCI state and the second TCI state, wherein the DCI has a DCI format that includes an additional TCI indicator (ATI) field that indicates whether the second TCI state is to be selected too or not.

Example 21 includes the method of example 1 or 2, wherein the communication includes the PUSCH transmission, wherein the first TCI state is selected by default, and wherein the method further comprises: sending downlink control information (DCI) indicating a selection of the activated TCI state from the first TCI state and the second TCI state, wherein the selection corresponds to selecting the first TCI state only, selecting the second TCI state only, or selecting the first TCI state and the second TCI state, wherein the DCI has a DCI format that includes an additional TCI indicator (ATI) field that indicates whether the second TCI state is to be selected too or not.

Example 22 includes the method of example 1 or 2, wherein the communication includes the PUSCH transmission, and wherein the method further comprises: receiving or sending downlink control information (DCI) indicating a selection of the activated TCI state from the first TCI state and the second TCI state, wherein the selection corresponds to selecting the first TCI state only, selecting the second TCI state only, or selecting the first TCI state and the second TCI state, wherein the DCI has a DCI format that includes a first TCI selection indicator (TSI) field indicating whether the first TCI state is selected and a second TSI field indicating whether the second TCI state is selected.

Example 23 includes a UE comprising means to perform one or more elements of a method described in or related to any of the examples 1 and 3-22.

Example 24 includes one or more non-transitory computer-readable media comprising instructions to cause a UE, upon execution of the instructions by one or more processors of the UE, to perform one or more elements of a method described in or related to any of the examples 1 and 3-22.

Example 25 includes a UE comprising logic, modules, or circuitry to perform one or more elements of a method described in or related to any of the examples 1 and 3-22.

Example 26 includes a UE comprising: one or more processors and one or more computer-readable media comprising instructions that, when executed by the one or more processors, cause the one or more processors to perform one or more elements of a method described in or related to any of the examples 1 and 3-22.

Example 27 includes a network comprising means to perform one or more elements of a method described in or related to any of the examples 2-22.

Example 28 includes one or more non-transitory computer-readable media comprising instructions to cause a network, upon execution of the instructions by one or more processors of the network, to perform one or more elements of a method described in or related to any of the examples 2-22.

Example 29 includes a network comprising logic, modules, or circuitry to perform one or more elements of a method described in or related to any of the examples 2-22.

Example 30 includes a network comprising: one or more processors and one or more computer-readable media comprising instructions that, when executed by the one or more processors, cause the one or more processors to perform one or more elements of a method described in or related to any of the examples 2-22.

Example 31 includes a system comprising means to perform one or more elements of a method described in or related to any of the examples 1-22.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
processing circuit configured to:
process information indicating that a first transmission configuration indicator (TCI) state is activated and that a second TCI state is activated, wherein each one of the first TCI state and the second TCI state is applicable to a plurality of channels;
determine, based on downlink control information (DCI), an activated TCI state to use in association with a communication on a channel of the plurality of channels by at least selecting the activated TCI state from the first TCI state and the second TCI state,
wherein the communication includes a physical downlink shared channel (PDSCH) transmission to the UE or a physical uplink shared channel (PUSCH) transmission from a user equipment (UE),
wherein the DCI includes a sounding reference signal (SRS) resource set indication indicating a selection of the activated TCI state from the first TCI state and the second TCI state, wherein the selection corresponds to selecting the first TCI state only,
selecting the second TCI state only, or selecting the first TCI state and the second TCI state,
wherein the DCI has a DCI format that includes a first SRS resource set indication field indicating whether the first TCI state is selected,
a second SRS resource set indication field indicating whether the second TCI state is selected, and
a third SRS resource set indication field indicating whether the first TCI state and the second TCI state are selected; and
perform the communication based on the activated TCI state.

2. The apparatus of claim 1, wherein the one or more memory processing circuitry is further configured to:
determine, based on a predefined set of rules, that the first TCI state is to be used for a first transmission occasion and that the second TCI state is to be used for a second transmission occasion, wherein each one of the first transmission occasion and the second transmission occasion being a corresponding PDSCH transmission occasion or a corresponding PUSCH transmission.

3. The apparatus of claim 2, wherein the first transmission occasion and the second transmission occasion use an fdmScheme B, tdmScheme A, tdmScheme B, or a spatial division multiplexing (SDM) scheme.

4. The apparatus of claim 1, wherein the processing circuitry is further configured to:
determine, based on a predefined set of rules, that the first TCI state is used for a first frequency domain resource allocation of a PDSCH transmission occasion and that the second TCI state is used for a second frequency domain resource allocation of the PDSCH transmission occasion.

5. The apparatus of claim 1, wherein the processing circuitry is further configured to:
process radio resource control (RRC) information indicating a second selection of a second activated TCI state from the first TCI state and the second TCI state.

6. The apparatus of claim 5, wherein the RRC information indicates a mode index from a plurality of mode indices, wherein a first mode index corresponds to selecting the first TCI state, a second mode index corresponds to selecting the second TCI state, and a third mode index corresponds to selecting the first TCI state and the second TCI state.

7. The apparatus of claim 1, wherein the processing circuitry is further configured to:
process a media access control (MAC) control element (CE) indicating a second selection of a second activated TCI state from the first TCI state and the second TCI state, wherein the MAC CE includes a logical channel identifier (LCID) associated with a TCI state selection.

8. The apparatus of claim 7, wherein the MAC CE indicates a mode index selected from a plurality of mode indices, wherein a first mode index corresponds to selecting the first TCI state, a second mode index corresponds to selecting the second TCI state, and a third mode index corresponds to selecting the first TCI state and the second TCI state.

9. The apparatus of claim 8, wherein MAC CE includes a coreset pool identifier indicating that the mode index is associated with channels that are configured with a corresponding coreset pool index identifier.

10. The apparatus of claim 1, wherein the processing circuitry is further configured to:

process the DCI indicating the selection of the activated TCI state from the first TCI state and the second TCI state.

11. The apparatus of claim 10, wherein the DCI format includes a TCI field and a reserved field.

12. The apparatus of claim 10, wherein the includes a TCI field and an additional field with additional bits outside of the TCI field.

13. One or more non-transitory computer-readable storage media storing instructions that, upon execution cause operations comprising:
processing information indicating that a first transmission configuration indicator (TCI) state associated is activated and that a second TCI state is activated,
wherein each one of the first TCI state and the second TCI state is applicable to a plurality of channels;
determining, based on downlink control information (DCI), an activated TCI state to use in association with a communication on a channel of the plurality of channels by at least selecting the activated TCI state from the first TCI state and the second TCI state,
wherein the communication includes a physical downlink shared channel (PDSCH) transmission to the UE or a physical uplink shared channel (PUSCH) transmission from a user equipment (UE),
wherein the DCI includes a sounding reference signal (SRS) resource set indication indicating a selection of the activated TCI state from the first TCI state and the second TCI state,
wherein the selection corresponds to selecting the first TCI state only,
selecting the second TCI state only, or selecting the first TCI state and the second TCI state,
wherein the DCI has a DCI format that includes a first SRS resource set indication field indicating whether the first TCI state is selected,
a second SRS resource set indication field indicating whether the second TCI state is selected, and
a third SRS resource set indication field indicating whether the first TCI state and the second TCI state are selected; and
performing the communication based on the activated TCI state.

14. The one or more non-transitory computer-readable storage media of claim 12, wherein the first TCI state is selected by default for a channel, and wherein the operations further comprise:
processing the DCI indicating whether the second TCI state is to be selected too or not for the channel.

15. The one or more computer-readable storage media of claim 14, wherein the first TCI state is also used for a physical downlink control channel (PDCCH) transmission to the UE.

16. The one or more non-transitory computer-readable storage media of claim 12, wherein the operations further comprise:
processing the DCI indicating the selection of the activated TCI state from the first TCI state and the second TCI state, and wherein the DCI format includes a TCI field.

17. The one or more non-transitory computer-readable storage media of claim 12, wherein the operations further comprise:
processing the DCI indicating the selection of the activated TCI state from the first TCI state and the second TCI state, wherein the DCI DCI format includes a function indicator (FI) field indicating whether a function of the TCI field in the DCI is to indicate the selection of the activated TCI state.

18. The one or more non-transitory computer-readable storage media of claim 12, wherein the operations further comprise:
processing the DCI indicating the selection of the activated TCI state from the first TCI state and the second TCI state, and wherein the DCI format includes a TCI field and cyclic redundant check (CRC) bits;
determining that the CRC bits are associated with a scrambling sequence; and
determining that the scrambling sequence is associated with a function bit indicating whether a function of the TCI field is to indicate the selection of the activated TCI state.

19. A method comprising:
sending, to a user equipment (UE), information indicating that a first transmission configuration indicator (TCI) state associated with a first transmission and reception point (TRP) is activated and that
a second TCI state associated with a second TRP is activated,
wherein each one of the first TCI state and the second TCI state is applicable to a plurality of channels;
sending, to the UE, downlink control information (DCI) indicating that an activated TCI state is to be used in association with a communication on a channel of the plurality of channels by at least selecting,
wherein the DCI causes the UE to select the activated TCI state from the first TCI state and
the second TCI state and includes a sounding reference signal (SRS) resource set indication indicating a selection of the activated TCI state from the first TCI state and the second TCI state,
wherein the selection corresponds to selecting the first TCI state only,
selecting the second TCI state only, or selecting the first TCI state and the second TCI state,
wherein the DCI has a DCI format that includes a first SRS resource set indication field indicating whether the first TCI state is selected,
a second SRS resource set indication field indicating whether the second TCI state is selected, and
a third SRS resource set indication field indicating whether the first TCI state and the second TCI state are selected,
wherein the communication includes a physical downlink shared channel (PDSCH) transmission to the UE or a physical uplink shared channel (PUSCH) transmission from the UE; and
performing the communication based on the activated TCI state.

20. The method of claim 17, wherein the communication includes the PUSCH transmission, and
wherein the DCI format includes cyclic redundant check (CRC) bits.

21. The method of claim 17, wherein the communication includes the PUSCH transmission, wherein the first TCI state is selected by default, and wherein
the DCI format includes an additional TCI indicator (ATI) field that indicates whether the second TCI state is to be selected too or not.

22. The method of claim 17, wherein the communication includes the PUSCH transmission, and
wherein the DCI format includes a first TCI selection indicator (TSI) field indicating whether the first TCI state is selected and a second TSI field indicating whether the second TCI state is selected.

* * * * *

UNITED STATES PATENT AND TRADEMARK OFFICE
CERTIFICATE OF CORRECTION

PATENT NO. : 12,506,583 B2
APPLICATION NO. : 18/365944
DATED : December 23, 2025
INVENTOR(S) : Hong He et al.

Page 1 of 1

It is certified that error appears in the above-identified patent and that said Letters Patent is hereby corrected as shown below:

In the Claims

Column 31, Line 15, Claim 2: please delete "one or more memory".

Column 32, Line 6, Claim 12: insert --DCI format-- before the word includes.

Column 32, Line 45, Claim 14: delete "12" and insert --13--.

Column 32, Line 52, Claim 15: delete "14" and insert --13--.

Column 32, Line 55, Claim 16: delete "12" and insert --13--.

Column 32, Line 62, Claim 17: delete "12" and insert --13--.

Column 33, Line 4, Claim 18: delete "12" and insert --13--.

Column 34, Line 45, Claim 20: delete "17" and insert --19--.

Column 34, Line 45, Claim 21: delete "17" and insert --19--.

Column 34, Line 45, Claim 22: delete "17" and insert --19--.

Signed and Sealed this
Third Day of February, 2026

John A. Squires
*Director of the United States Patent and Trademark Office*